US008560190B2

(12) United States Patent
Sugiura et al.

(10) Patent No.: US 8,560,190 B2
(45) Date of Patent: Oct. 15, 2013

(54) CONTROL DEVICE FOR AUTOMATIC TRANSMISSION AND CONTROL PROGRAM FOR AUTOMATIC TRANSMISSION

(75) Inventors: Yukio Sugiura, Hekinan (JP); Masaki Nishide, Okazaki (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 105 days.

(21) Appl. No.: 13/231,508

(22) Filed: Sep. 13, 2011

(65) Prior Publication Data

US 2012/0078479 A1 Mar. 29, 2012

(30) Foreign Application Priority Data

Sep. 28, 2010 (JP) ................................ 2010-216908

(51) Int. Cl.
*G06F 19/00* (2011.01)
(52) U.S. Cl.
USPC ............................................. 701/55; 701/66
(58) Field of Classification Search
USPC ....................................................... 701/55, 66
See application file for complete search history.

(56) References Cited

U.S. PATENT DOCUMENTS

| 5,609,067 | A * | 3/1997 | Mitchell et al. ............ 74/336 R |
| 7,108,633 | B2 * | 9/2006 | Hasegawa et al. ............... 477/70 |
| 7,421,326 | B2 * | 9/2008 | Thor et al. ......................... 701/67 |
| 7,658,497 | B2 * | 2/2010 | Miwa et al. ....................... 353/20 |
| 7,682,275 | B2 * | 3/2010 | Yoneyama ..................... 475/119 |
| 8,214,118 | B2 * | 7/2012 | Murakami et al. .............. 701/66 |
| 8,290,671 | B2 * | 10/2012 | Nishide et al. ................... 701/63 |
| 2004/0073350 | A1 | 4/2004 | Nagata et al. |
| 2007/0298932 | A1 | 12/2007 | Yoneyama |
| 2010/0121542 | A1 * | 5/2010 | Tsukamoto et al. ............ 701/51 |
| 2010/0168972 | A1 | 7/2010 | Murakami et al. |
| 2011/0239800 | A1 * | 10/2011 | Sekii et al. .................... 74/473.1 |
| 2011/0246036 | A1 * | 10/2011 | Tsutsui et al. ................... 701/67 |
| 2011/0251767 | A1 * | 10/2011 | Tsutsui et al. ................... 701/67 |

FOREIGN PATENT DOCUMENTS

| JP | 2000-240785 A | 9/2000 |
| JP | 2004-132493 A | 4/2004 |
| JP | 2007-255439 A | 10/2007 |
| JP | 2007255518 A | * 10/2007 |
| JP | 2008-002553 A | 1/2008 |
| JP | 2009-058112 A | 3/2009 |
| WO | 2010/073648 A1 | 7/2010 |

OTHER PUBLICATIONS

International Search Report issued in PCT/JP2011/005270, dated Dec. 27, 2011.

* cited by examiner

*Primary Examiner* — Mary Cheung
*Assistant Examiner* — Michael Berns
(74) *Attorney, Agent, or Firm* — Sughrue Mion, PLLC

(57) ABSTRACT

A control device for an automatic transmission including a neutral control unit that executes neutral control for bringing the automatic transmission into a neutral state by reducing an engagement force for an engaged frictional engagement element; a speed ratio specifying unit that specifies an actual speed ratio of the automatic transmission on the basis of a rotating speed of an input shaft and a rotating speed of an output shaft; and a first failure determination unit that determines whether or not a failure is occurring in the automatic transmission on the basis of the actual speed ratio during execution of the neutral control. The first failure determination unit determines that a failure is occurring in the automatic transmission in the case where the actual speed ratio coincides with the speed ratio of any one of a plurality of shift speeds over a predetermined time.

10 Claims, 11 Drawing Sheets

FIG. 3

|  | C1 | C2 | C3 | B1 | B2 | F1 |
|---|---|---|---|---|---|---|
| P |  |  |  |  |  |  |
| REV |  |  | ○ |  | ○ |  |
| N |  |  |  |  |  |  |
| 1ST | ○ |  |  |  | (○) | ○ |
| 2ND | ○ |  |  | ○ |  |  |
| 3RD | ○ |  | ○ |  |  |  |
| 4TH | ○ | ○ |  |  |  |  |
| 5TH |  | ○ | ○ |  |  |  |
| 6TH |  | ○ |  | ○ |  |  |

FIG. 9 FAILURE TIMES

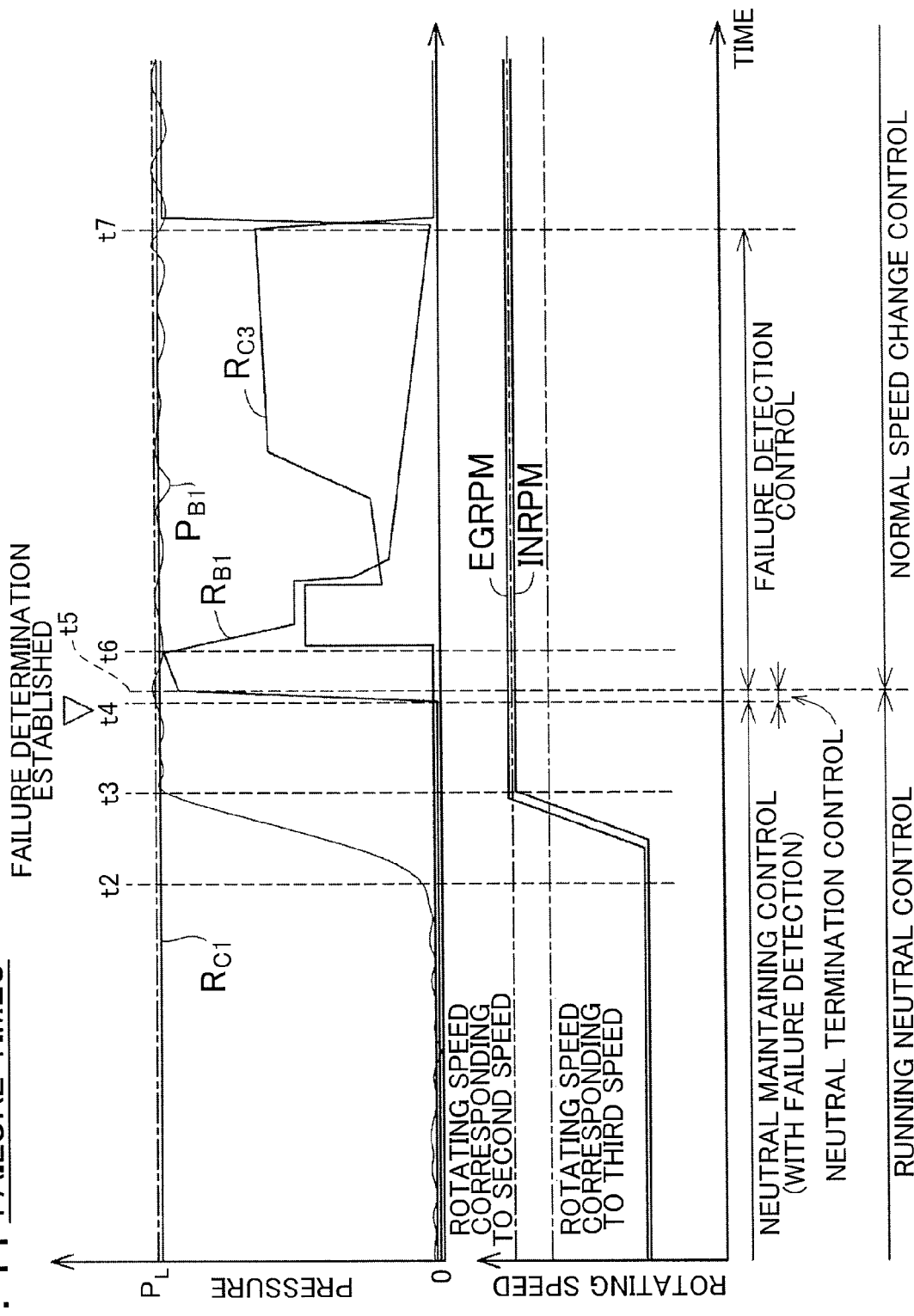
FIG. 11 FAILURE TIMES

CONTROL DEVICE FOR AUTOMATIC TRANSMISSION AND CONTROL PROGRAM FOR AUTOMATIC TRANSMISSION

INCORPORATION BY REFERENCE

The disclosure of Japanese Patent Application No. 2010-216908 filed on Sep. 28, 2010 including the specification, drawings and abstract is incorporated herein by reference in its entirety.

BACKGROUND OF THE INVENTION

The present invention relates to a control device for an automatic transmission and a control program for an automatic transmission, and particularly to a control device for an automatic transmission and a control program for an automatic transmission that control the automatic transmission to a neutral state in the case where predetermined conditions are met.

DESCRIPTION OF THE RELATED ART

A technique that controls an automatic transmission mounted on a vehicle to a neutral state, in which no power of an engine is transferred to a drive axle, in the case where predetermined start conditions, which include a stationary state of the vehicle as a necessary condition, are satisfied even though a shift position operated by a driver is in a forward range (D range) is known in the art (Japanese Patent Application Publication No. JP-A-2009-58112, for example).

According to technique, energy consumed by a torque converter is reduced by controlling the automatic transmission to the neutral state when the vehicle is stationary. Therefore, it is possible to reduce the engine speed and hence to improve the fuel efficiency of the vehicle compared to a case where the automatic transmission is not controlled to the neutral state.

SUMMARY OF THE INVENTION

While the above related art improves the fuel efficiency by performing neutral control while the vehicle is stationary, it is also conceivable to perform such neutral control during running. In this case, if unintentional engagement of a frictional engagement element is caused during the neutral control or when the automatic transmission is returned from the neutral control to normal speed change control, a problem may be caused in terms of the durability of the automatic transmission, the drivability of the vehicle, and so forth because the vehicle is running. For example, when the automatic transmission is switched from the neutral state to a shift speed that is established by engaging two frictional engagement elements, an engagement hydraulic pressure may be erroneously produced for three engagement elements. In such a case, one of the three frictional engagement elements slips even though an engagement hydraulic pressure is produced for the frictional engagement element, which may wear the frictional engagement element and decelerate the vehicle. Thus, in order to avoid such a problem, it is preferable to detect a failure such as unintentional engagement of a frictional engagement element in the case where the neutral control is performed while the vehicle is running.

In a technique for detecting a failure during running according to the related art, it is determined that a failure is occurring in the case where the speed ratio of an intended shift speed (control shift speed) is different from the speed ratio of a shift speed actually established in the automatic transmission. The technique presupposes that the speed ratio of the control shift speed is fixed at a particular value.

In the case where the automatic transmission is controlled to the neutral state during running, however, the speed ratio is constantly varying in accordance with the engine speed and the wheel speed (vehicle speed), with an input shaft of the automatic transmission rotating generally in synchronization with a crankshaft of the engine and with an output shaft of the automatic transmission rotating in synchronization with the wheels. Thus, the speed ratio is not fixed at a particular value while the automatic transmission is controlled to the neutral state during running, and therefore the technique for detecting a failure during running according to the related art may not be applied.

It is an object of the present invention to provide a technique for controlling an automatic transmission that can appropriately detect a failure even in the case where the automatic transmission is controlled to a neutral state during running.

The present invention has been made to address at least a part of the above issue, and can be implemented in the following forms or application examples.

Application Example 1

A control device for an automatic transmission that is disposed in a power transfer path from a drive source of a vehicle to drive wheels, that includes a plurality of frictional engagement elements, an input shaft, and an output shaft, and that can establish a plurality of shift speeds that are different in speed ratio in accordance with an engagement state of the plurality of frictional engagement elements, the speed ratio being a ratio between a rotating speed of the input shaft and a rotating speed of the output shaft includes: a neutral control unit that executes neutral control for bringing the automatic transmission into a neutral state by reducing an engagement force for an engaged frictional engagement element in the case where running conditions are satisfied, the neutral state being a state in which power transfer between the input shaft and the output shaft is suppressed, and the running conditions including an accelerator of the vehicle not being operated in a state in which the vehicle is running forward and in a state in which any one of the plurality of shift speeds is established; a speed ratio specifying unit that specifies an actual speed ratio of the automatic transmission on the basis of the rotating speed of the input shaft and the rotating speed of the output shaft; and a first failure determination unit that determines whether or not a failure is occurring in the automatic transmission on the basis of the actual speed ratio during execution of the neutral control. In the control device, the first failure determination unit determines that a failure is occurring in the automatic transmission in the case where the actual speed ratio coincides with the speed ratio of any one of the plurality of shift speeds over a predetermined time.

According to the control device for an automatic transmission configured as described above, it is possible to specify the actual speed ratio of the automatic transmission and to determine a failure in the automatic transmission on the basis of the specified actual speed ratio even in the case where the automatic transmission is controlled to the neutral state in order to improve the fuel efficiency with the vehicle running forward. Specifically, it is determined that a failure is occurring in the case where the actual speed ratio coincides with the speed ratio of any one of the plurality of shift speeds over a predetermined time. Thus, it is possible to appropriately detect a failure in which the speed ratio during the neutral control, which would normally vary sequentially, is kept at the speed ratio of one shift speed because of unintentional engagement of a frictional engagement element. Thus, unintentional engagement of a frictional engagement element described above can be suppressed. As a result, it is possible to suppress wear of a frictional engagement element, deceleration of the vehicle, and so forth due to unnecessary slip of a frictional engagement element, and to improve the durability of the automatic transmission and the drivability of the vehicle.

Application Example 2

In the control device for an automatic transmission according to Application Example 1, the neutral control unit may include a first neutral termination control unit that executes neutral termination control for shifting the automatic transmission to any one of the plurality of shift speeds in the case where termination conditions are satisfied during execution of the neutral control; and the first failure determination unit may determine whether or not a failure is occurring in the automatic transmission during execution of the neutral termination control.

According to the control device for an automatic transmission configured as described above, it is determined whether or not a failure is occurring during execution of the neutral termination control. Thus, any shift speed can be immediately established in the automatic transmission in the case where a failure is not occurring and the termination conditions are satisfied to terminate the neutral control. Specifically, it is possible to immediately establish any shift speed in the automatic transmission compared to a case where it is determined whether or not a failure is occurring in the case where the termination conditions are satisfied and thereafter the neutral termination control is performed. In addition, it is determined whether or not a failure is occurring during execution of the neutral termination control. Thus, measures against a failure may be taken at the moment when it is determined that a failure is occurring, and therefore complication of control can be suppressed. For example, in the case where it is determined whether or not a failure is occurring during control to the neutral state and measures against a failure are taken after the termination conditions are satisfied, a scheme for storing the failure determination results (such as a flag) is required, which may complicates control. According to the present configuration, however, such complication can be avoided.

Application Example 3

In the control device for an automatic transmission according to Application Example 2, in the case where it is determined by the first failure determination unit that a failure is not occurring, the first neutral termination control unit may shift the automatic transmission to a shift speed, of the plurality of shift speeds, that is determined on the basis of an operation amount of the accelerator and a vehicle speed of the vehicle, and in the case where it is determined by the first failure determination unit that a failure is occurring, the first neutral termination control unit may shift the automatic transmission to a shift speed, of the plurality of shift speeds, that corresponds to the actual speed ratio.

According to the control device for an automatic transmission configured as described above, in the case where it is determined by the first failure determination unit that a failure is occurring, shifting to a shift speed corresponding to the actual speed ratio, rather than to a shift speed determined on the basis of the operation amount of the accelerator and the vehicle speed of the vehicle, is performed. As a result, a command for shifting to a shift speed that is different from the shift speed corresponding to the actual speed ratio is issued even though a failure is occurring, which makes it possible to avoid occurrence of unintentional engagement of a frictional engagement element. For example, in the case where two frictional engagement elements are engaged because of a failure, a command for shifting to a shift speed established by engaging a frictional engagement element that is different from the two frictional engagement elements may be issued. In such a case, the different frictional engagement element is engaged in addition to the two frictional engagement elements, which may cause any of the three frictional engagement elements to slip. According to the present configuration, in the case where two frictional engagement elements are engaged because of a failure, a command for shifting to the shift speed actually established through engagement of the two frictional engagement elements is issued, for example. Therefore, the actually established shift speed coincides with the shift speed according to the command for shifting, avoiding unintentional engagement of a frictional engagement element. As a result, slip of a frictional engagement element described above can be avoided. Thus, it is possible to suppress wear of a frictional engagement element, deceleration of the vehicle, and so forth due to unnecessary slip of a frictional engagement element.

Application Example 4

The control device for an automatic transmission according to Application Example 3 may further include a second failure determination unit that determines whether or not a failure is occurring in the automatic transmission after execution of the neutral termination control. In the control device, in the case where it is determined by the first failure determination unit that a failure is not occurring, the second failure determination unit may determine whether or not a failure is occurring in the automatic transmission after a predetermined period elapses further after the neutral termination control is executed, and in the case where it is determined by the first failure determination unit that a failure is occurring, the second failure determination unit may determine whether or not a failure is occurring in the automatic transmission without waiting for the predetermined period to elapse after the neutral control is executed.

According to the control device for an automatic transmission configured as described above, in the case where it is determined by the first failure determination unit that a failure is occurring, the second failure determination unit can quickly perform a failure determination. As a result, it is possible to quickly determine whether or not a failure is occurring in the automatic transmission.

Application Example 5

In the control device for an automatic transmission according to any one of Application Examples 1 to 4, the state in which the vehicle is running forward may be a state in which the vehicle is running forward at a prescribed speed determined in advance or more.

According to the control device for an automatic transmission configured as described above, the neutral control is executed when the vehicle is running forward at a speed that is not less than a prescribed speed, at which the vehicle can run utilizing dynamic energy that the vehicle has. Therefore, the fuel efficiency can be improved by utilizing the dynamic energy that the vehicle has, without wasting the dynamic energy (specifically, without causing a loss of the dynamic energy due to engine brake).

Application Example 6

In the control device for an automatic transmission according to Application Example 1, the neutral control unit may include a second neutral termination control unit that executes neutral termination control for shifting the automatic transmission to any one of the plurality of shift speeds in the case where it is determined by the first failure determination unit that a failure is occurring.

According to the control device for an automatic transmission configured as described above, in the case where it is determined that a failure is occurring, the automatic transmission is quickly shifted to any shift speed (for example, a shift speed corresponding to the actual speed ratio being established when it is determined that a failure is occurring). Thus, the neutral control can be quickly terminated in the case where the automatic transmission is unintentionally in a state in which the speed ratio of the shift speed is established over a predetermined time even though the automatic transmission is controlled to the neutral state.

The present invention can be implemented in a variety of forms such as a control program for an automatic transmission, a storage medium storing the control program, a control method for an automatic transmission, and a vehicle including an automatic transmission, for example.

BRIEF DESCRIPTION OF THE DRAWINGS

FIG. 3 is an operation table of a speed change mechanism 5;

FIG. 11 is a timing chart illustrating the running neutral control according to the second embodiment in the case where a failure has occurred in the automatic transmission 10.

DETAILED DESCRIPTION OF THE EMBODIMENTS

Now, an embodiment of the present invention will be described with reference to FIGS. 1 to 9.

A. First Embodiment

Figure 1:
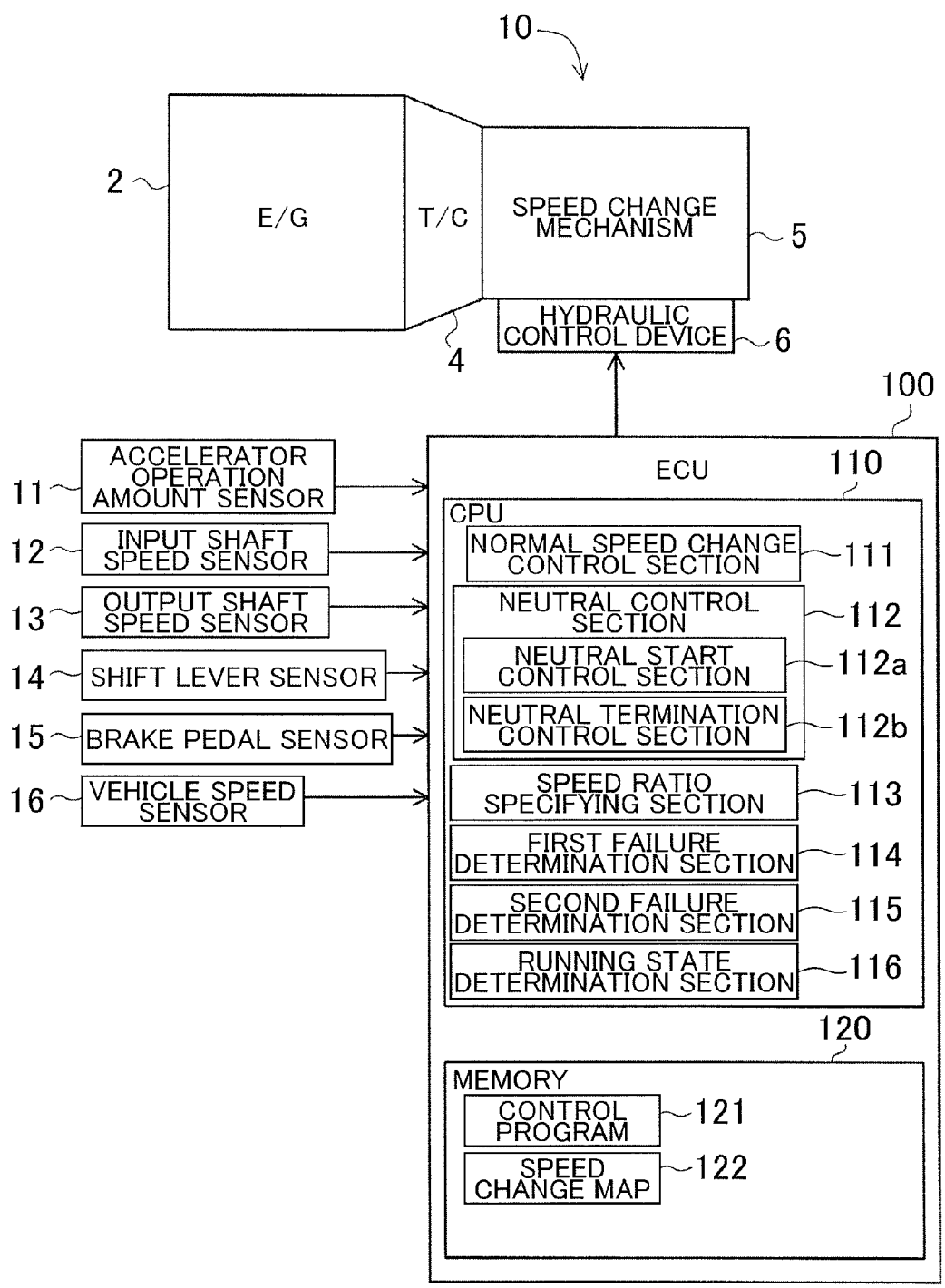
FIG. 1 shows a schematic configuration of a vehicle incorporating an automatic transmission 10 according to an embodiment of the present invention.
Figure 2:
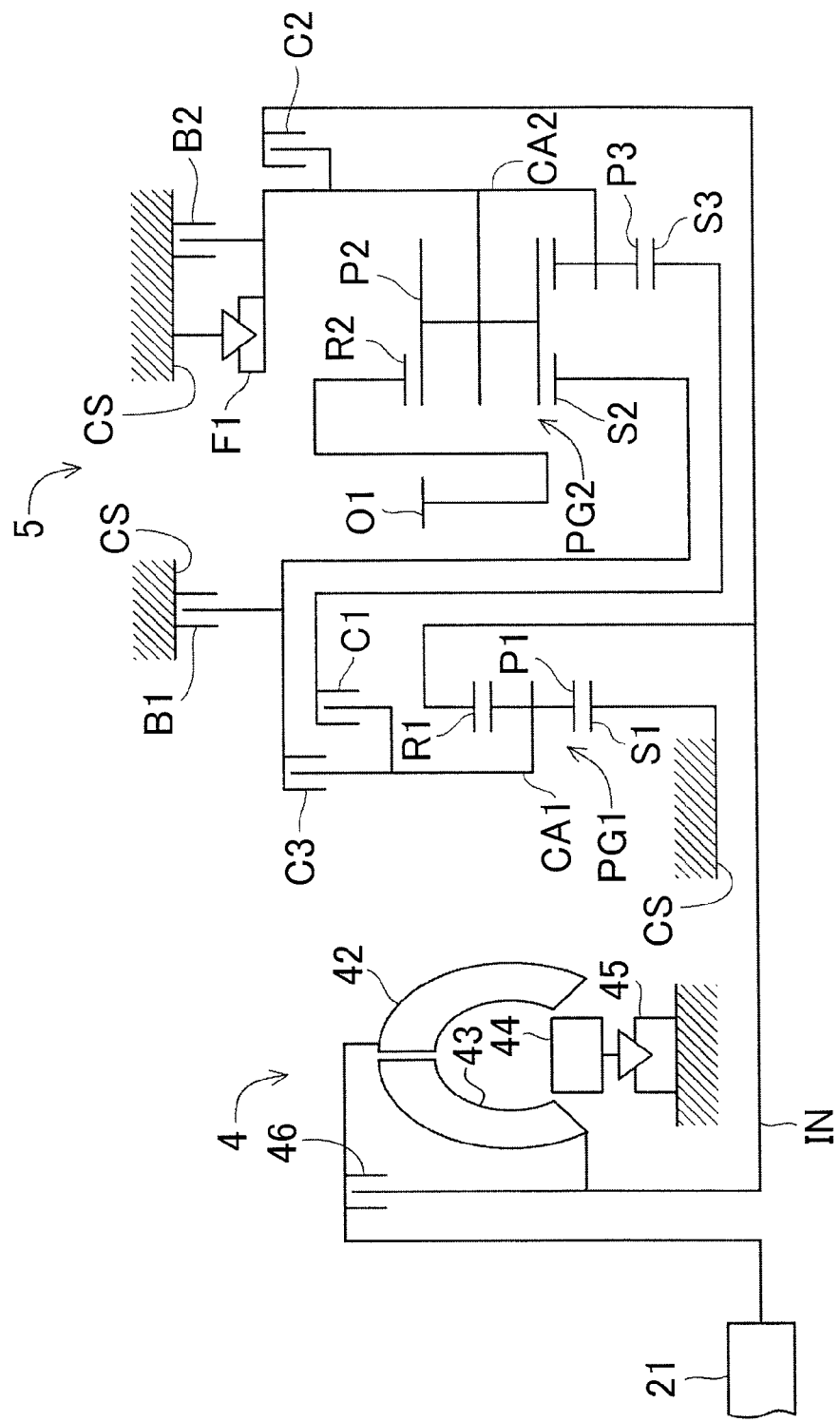
FIG. 2 is a skeleton diagram showing the mechanical configuration of the automatic transmission 10.

FIG. 1 shows a schematic configuration of a vehicle incorporating an automatic transmission 10 according to an embodiment of the present invention. In FIG. 1, in order to avoid complication of the drawing, components associated with the automatic transmission 10 are selectively shown. FIG. 2 is a skeleton diagram showing the mechanical configuration of the automatic transmission 10. In FIG. 2, only generally the upper half is shown, and generally the lower half is not shown.

As shown in FIG. 1, the vehicle includes an engine 2 serving as a drive source, the automatic transmission 10, and an electric control unit (also referred to as an "ECU") 100.

The engine 2 is a multi-cylinder gasoline engine, for example, and outputs torque for driving the vehicle to a crankshaft 21 (FIG. 2) serving as an output shaft of the engine 2.

The automatic transmission 10 includes a torque converter 4, a speed change mechanism 5, and a hydraulic control device 6.

The torque converter 4 includes a pump impeller 42, a turbine runner 43, a stator 44, a one-way clutch 45, and a lock-up clutch 46. The pump impeller 42 is coupled to the crankshaft 21 of the engine 2. The turbine runner 43 is coupled to an input shaft IN of the speed change mechanism 5 to be described later. When the pump impeller 42 rotates together with the crankshaft 21, rotation of the pump impeller 42 is transferred to the turbine runner 43 via an ATF (automatic transmission fluid) serving as a working fluid. The stator 44 is disposed between the pump impeller 42 and the turbine runner 43 so as to be rotatable only in one direction through the one-way clutch 45. The stator 44 amplifies torque of rotation transferred from the pump impeller 42 to the turbine runner 43. The lock-up clutch 46 is a clutch that can engage the crankshaft 21 and the input shaft IN of the speed change mechanism 5 with each other. When the lock-up clutch 46 is brought into an engaged state, rotation of the crankshaft 21 is transferred to the input shaft IN of the speed change mechanism 5 not via the pump impeller 42 or the turbine runner 43.

The speed change mechanism 5 includes the input shaft IN, an output shaft O1, a first planetary gear set PG1, a second planetary gear set PG2, clutches C1, C2, and C3 each serving as a frictional engagement element that operates on the basis of a hydraulic pressure, brakes B1 and B2 each serving as a frictional engagement element that operates on the basis of a hydraulic pressure, a one-way clutch F1, and a case CS that houses these constituent elements.

As described above, the input shaft IN is connected to the crankshaft 21 via the torque converter 4. The output shaft O1 includes a counter gear formed thereon, and is connected to drive wheels (not shown) via a counter shaft and a differential device (not shown).

The first planetary gear set PG1 is of a single pinion type, and includes a sun gear S1, a carrier CA1, a ring gear R1, and a plurality of pinion gears P1. The plurality of pinion gears P1 are rotatably held by the carrier CA1. The sun gear S1, which is an externally toothed gear, and the ring gear R1, which is an internally toothed gear, are disposed concentrically with each other, and each meshed with the plurality of pinion gears P1.

The sun gear S1 is fixed to the case CS. The ring gear R1 is formed integrally with the input shaft IN.

The second planetary gear set PG2 is of a Ravigneaux type, and includes two sun gears S2 and S3, a carrier CA2, a ring gear R2, a plurality of long pinion gears P2, and a plurality of short pinion gears P3. The respective numbers of the long pinion gears P2 and short pinion gears P3 are the same as each other. The long pinion gears P2 and the short pinion gears P3 are rotatably held by the carrier CA2 with each long pinion gear P2 meshed with each corresponding short pinion gear P3. The sun gears S2 and S3, which are each an externally toothed gear, and the ring gear R2, which is an internally toothed gear, are disposed concentrically with each other. The sun gear S2 and the ring gear R2 are each meshed with the plurality of long pinion gears P2. The sun gear S3 is meshed with the plurality of short pinion gears P3. The ring gear R2 is formed integrally with the output shaft O1.

The clutches C1 to C3 are each a wet multi-plate clutch, and controlled to an engaged state and a disengaged state by a hydraulic pressure supplied to a hydraulic servo. Hereinafter, the hydraulic pressures supplied to the hydraulic servos for the clutches C1, C2, and C3 are respectively referred to as "control pressures $P_{C1}$, $P_{C2}$, and $P_{C3}$". The clutch C1 couples the carrier CA1 of the first planetary gear set PG1 and the sun gear S3 of the second planetary gear set PG2 to each other in the engaged state, and decouples the carrier CA1 and the sun gear S3 from each other in the disengaged state. The clutch C2 couples the input shaft IN and the carrier CA2 of the second planetary gear set PG2 to each other in the engaged state, and decouples the input shaft IN and the carrier CA2 from each other in the disengaged state. The clutch C3 couples the carrier CA1 of the first planetary gear set PG1 and the sun gear S2 of the second planetary gear set PG2 to each other in the engaged state, and decouples the carrier CA1 and the sun gear S2 from each other in the disengaged state.

The brakes B1 and B2 are each a wet multi-plate brake, and controlled to an engaged state and a disengaged state by a hydraulic pressure supplied to a hydraulic servo. Hereinafter, the hydraulic pressures supplied to the hydraulic servos for the brakes B1 and B2 are respectively referred to as "control pressures $P_{B1}$ and $P_{B2}$". The brake B1 couples the case CS and the sun gear S2 of the second planetary gear set PG2 to each other in the engaged state, and decouples the case CS and the sun gear S2 from each other in the disengaged state. The brake B2 couples the case CS and the carrier CA2 of the second planetary gear set PG2 to each other in the engaged state, and decouples the case CS and the carrier CA2 from each other in the disengaged state.

The one-way clutch F1 is disposed between the case CS and the carrier CA2 of the second planetary gear set PG2. The one-way clutch F1 prohibits the carrier CA2 of the second planetary gear set PG2 from rotating in the opposite direction to the rotational direction of the crankshaft 21. On the other hand, the one-way clutch F1 permits the carrier CA2 of the second planetary gear set PG2 to rotate in the same direction as the rotational direction of the crankshaft 21.

Figure 3:
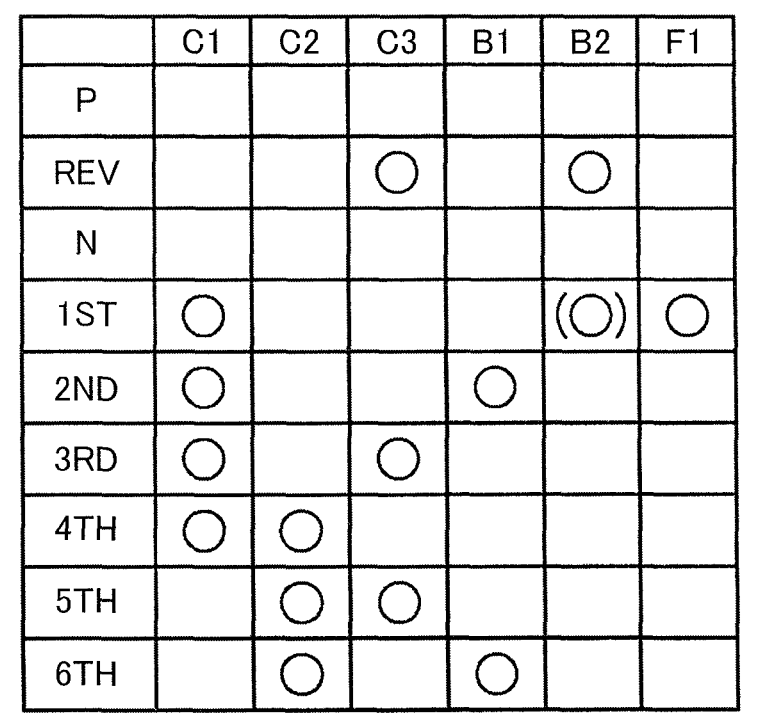

Next, an operation of the speed change mechanism 5 will be described. FIG. 3 is an operation table of the speed change mechanism 5. In FIG. 3, of the clutches C1 to C3 and the brakes B1 and B2, those frictional engagement elements which are given a circular symbol in their box corresponding to a shift speed are brought into the engaged state to establish the shift speed. On the other hand, of the clutches C1 to C3 and the brakes B1 and B2, those frictional engagement elements which are given no symbol in their box corresponding to a shift speed are brought into the disengaged state to establish the shift speed.

Figure 4:
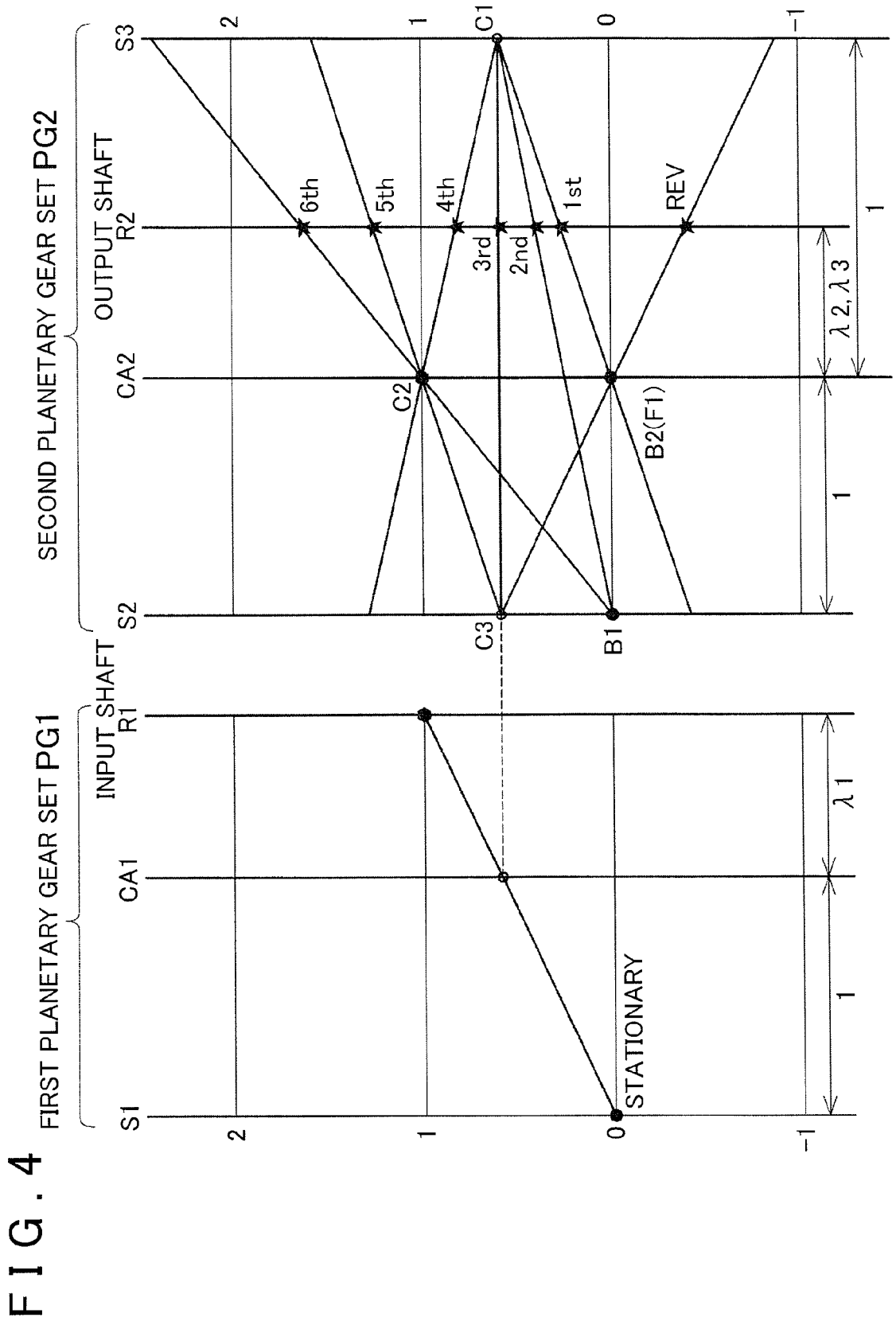
FIG. 4 is a velocity diagram of the speed change mechanism 5.

FIG. 4 is a velocity diagram of the speed change mechanism 5. When the clutches C1 to C3 and the brakes B1 and B2 are engaged or disengaged as shown in FIG. 3, the speed ratios of the respective elements of the first planetary gear set PG1 and the second planetary gear set PG2 are as shown in the velocity diagram of FIG. 4. As seen from the velocity diagram of FIG. 4, first to fourth forward speeds at which rotation input to the ring gear R1 is output to the ring gear R2 with a reduced rotating speed, a fifth forward speed and sixth forward speed at which rotation input to the ring gear R1 is output to the ring gear R2 with an increased rotating speed, and a reverse speed at which rotation input to the ring gear R1 is output to the ring gear R2 with a reversed rotational direction, are established through combinations of engaged state/disengaged state of the clutches C1 to C3 and the brakes B1 and B2 shown in the operation table of FIG. 3.

Next, the hydraulic control device 6 will be described. First, a portion (not shown) of the hydraulic control device 6 (FIG. 1) that generates a line pressure, a secondary pressure, a modulator pressure, and so forth will be roughly described. The portion that generates a line pressure, a secondary pressure, a modulator pressure, and so forth is similar to that of a common hydraulic control device for an automatic transmission and widely known, and thus will be briefly described.

The hydraulic control device 6 includes, for example, an oil pump, a manual shift valve, a primary regulator valve, a secondary regulator valve, a solenoid modulator valve, a linear solenoid valve, and so forth (not shown). The oil pump is connected to the pump impeller 42 of the torque converter 4, and driven in conjunction with rotation of the crankshaft 21 of the engine 2. The oil pump sucks oil (ATF) from an oil pan (not shown) via a strainer to generate a hydraulic pressure.

Figure 5:
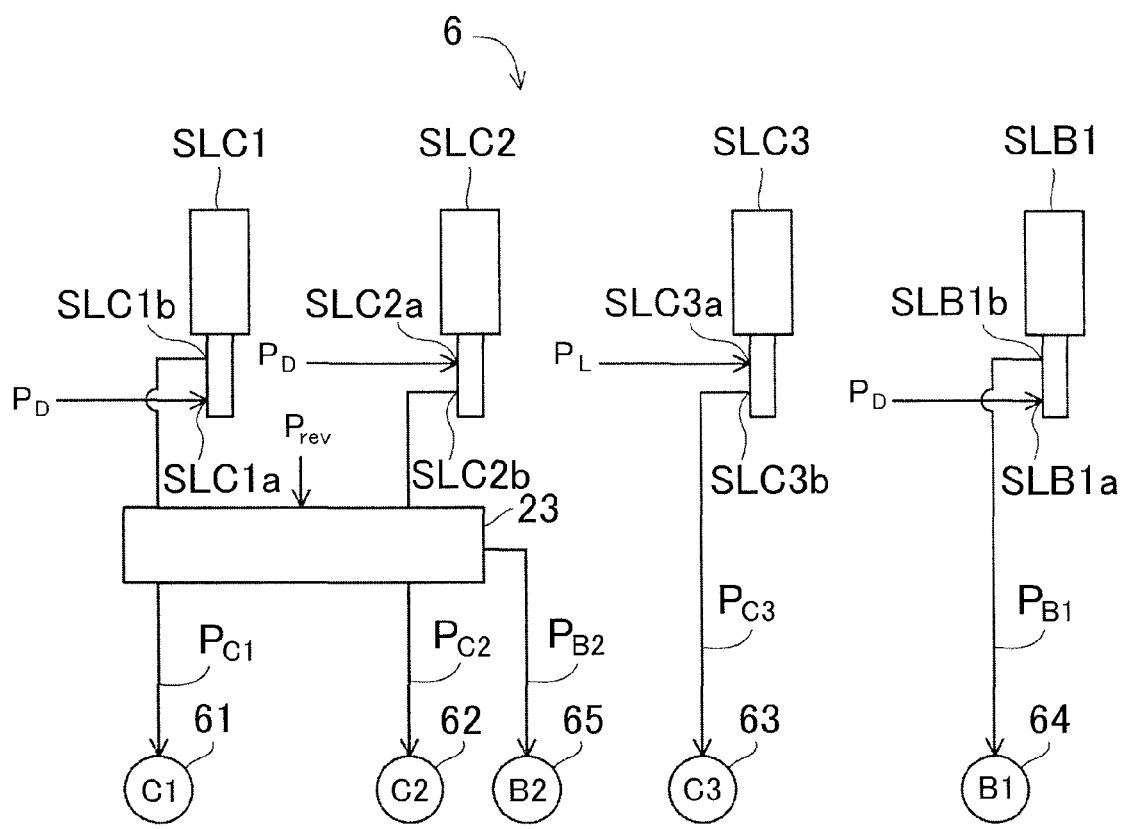
FIG. 5 is a schematic diagram showing an extracted portion of a hydraulic control device 6 of the automatic transmission 10.

Next, a portion of the hydraulic control device 6 that mainly performs speed change control will be described. FIG. 5 is a schematic diagram showing an extracted portion of the hydraulic control device 6 of the automatic transmission 10. The hydraulic control device 6 includes four linear solenoid valves SLC1, SLC2, SLC3, and SLB1 and a switching valve 23 configured to regulate and supply the control pressures $P_{C1}$, $P_{C2}$, $P_{C3}$, $P_{B1}$, and $P_{B2}$ described above to a hydraulic servo 61 for the clutch C1, a hydraulic servo 62 for the clutch C2, a hydraulic servo 63 for the clutch C3, a hydraulic servo 64 for the brake B1, and a hydraulic servo 65 for the brake B2 described above, respectively. In practice, the switching valve 23 is not a single valve but is formed by a solenoid valve, a plurality of relay valves, and so forth (not shown), which are shown collectively in FIG. 5.

A forward range pressure $P_D$ is supplied from a forward range pressure output port of the manual shift valve described above to respective input ports SLC1a, SLC2a, and SLB1a of the linear solenoid valves SLC1, SLC2, and SLB1. A line pressure $P_L$ is supplied from the primary regulator valve to an input port SLC3a of the linear solenoid valve SLC3. A reverse range pressure $P_{REV}$ is supplied from a reverse range pressure output port of the manual shift valve described above to the switching valve 23.

The linear solenoid valve SLC1 is of a normally closed type that makes no output when not energized. The linear solenoid valve SLC1 regulates the forward range pressure $P_D$ supplied to the input port SCL1a to output from an output port SLC1b the control pressure $P_{C1}$ to be supplied to the hydraulic servo 61 for the clutch C1. The linear solenoid valve SLC1 is configured to output the control pressure $P_{C1}$ in accordance with a command value from the ECU 100 by adjusting the amount of communication (amount of opening) between the input port SLC1a and the output port SLC1b on the basis of the command value.

The linear solenoid valve SLC2 is of a normally open type that makes an output when not energized. The linear solenoid valve SLC2 regulates the forward range pressure $P_D$ supplied to the input port SCL2a to output from an output port SLC2b the control pressure $P_{C2}$ to be supplied to the hydraulic servo 62 for the clutch C2 and the control pressure $P_{B2}$ to be supplied to the hydraulic servo 65 for the brake B2. The linear solenoid valve SLC2 is configured to output the control pressures $P_{C1}$ and $P_{B2}$ in accordance with a command value from the ECU 100 by adjusting the amount of communication (amount of opening) between the input port SCL2a and the output port SLC2b on the basis of the command value.

The linear solenoid valve SLC3 is of a normally open type that makes an output when not energized. The linear solenoid valve SLC3 regulates the line pressure $P_L$ supplied to the input port SLC3a to output from an output port SLC3b the control pressure $P_{C3}$ to be supplied to the hydraulic servo 63 for the clutch C3. The linear solenoid valve SLC3 is configured to output the control pressure $P_{C3}$ in accordance with a command value from the ECU 100 by adjusting the amount of communication (amount of opening) between the input port SLC3a and the output port SLC3b on the basis of the command value.

The linear solenoid valve SLB1 is of a normally closed type that makes no output when not energized. The linear solenoid valve SLB1 regulates the forward range pressure $P_D$ supplied to the input port SLB1a to output from an output port SLB1b the control pressure $P_{B1}$ to be supplied to the hydraulic servo 64 for the brake B1. The linear solenoid valve SLB1 is configured to output the control pressure $P_{B1}$ in accordance with a command value from the ECU 100 by adjusting the amount of communication (amount of opening) between the input port SLB1a and the output port SLB1b on the basis of the command value.

The switching valve 23 is configured to be able to supply the control pressure $P_{C1}$ output from the linear solenoid valve SLC1 to the hydraulic servo 61 for the clutch C1. The switching valve 23 is also configured to be able to supply the control pressure $P_{C2}$ and the control pressure $P_{B2}$ output from the linear solenoid valve SLC2 to the hydraulic servo 62 for the clutch C2 and the hydraulic servo 65 for the brake B2, respectively, by switching between oil passages. The switching valve 23 is further configured to be able to supply the reverse range pressure $P_{REV}$ from the manual shift valve to the hydraulic servo 65 for the brake B2 as the control pressure $P_{B2}$. Specifically, the switching valve 23 supplies the reverse range pressure $P_{REV}$ to the hydraulic servo 65 for the brake B2 as the control pressure $P_{B2}$ to establish the reverse speed, and supplies the control pressure $P_{B2}$ output from the linear solenoid valve SLC2 to the hydraulic servo 65 for the brake B2 to apply engine brake with the first speed established.

Next, returning to FIG. 1, the ECU 100 which functions as a control device for the automatic transmission 10 will be described. The vehicle includes, as sensors that transmit an electrical signal indicating various information to the ECU 100, an accelerator operation amount sensor 11 that transmits an accelerator operation amount signal indicating an accelerator operation amount, an input shaft speed sensor 12 that transmits a signal related to the number of revolutions per unit time (rotating speed) of the input shaft IN (FIG. 2) of the automatic transmission 10, an output shaft speed sensor 13 that transmits a signal related to the number of revolutions per unit time (rotating speed) of the output shaft O1 (FIG. 2) of the automatic transmission 10, a shift lever sensor 14 that transmits a shift position signal indicating the position of a shift lever, a brake pedal sensor 15 that transmits a brake operation amount signal indicating the amount of operation (amount of depression) of a brake pedal, and a vehicle speed sensor 16 that transmits a vehicle speed signal indicating the vehicle speed of the vehicle. The ECU 100 is configured to be able to control the linear solenoid valves SLC1, SLC2, SLC3, and SLB1 of the hydraulic control device 6 described above by transmitting a command value to the linear solenoid valves SLC1, SLC2, SLC3, and SLB1 as an electrical signal (control signal).

The ECU 100 performs a variety of controls on the basis of the signals from the sensors. In FIG. 1, portions related to control, of these controls, of the automatic transmission 10 associated with the description of the embodiment are selectively shown.

The ECU 100 is a widely known computer including a central processing unit (CPU) 110 and a memory 120 such as a ROM (read only memory) and a RAM (random access memory). The memory 120 stores a control program 121 and a speed change map 122. The CPU 110 executes the control program 121 to implement various functional sections shown in FIG. 1. Specifically, the CPU 110 implements functions as a normal speed change control section 111, a neutral control section 112, a speed ratio specifying section 113, a first failure determination section 114, a second failure determination section 115, and a running state determination section 116.

The normal speed change control section 111 executes normal speed change control for controlling a shift speed to be established in the speed change mechanism 5. Specifically, while the normal control is performed, the ECU 100 repeatedly executes a routine for determining an adequate shift speed with reference to the speed change map 122 on the basis of the shift lever position acquired from the shift lever sensor 14, the accelerator operation amount acquired from the accelerator operation amount sensor 11, and the vehicle speed acquired from the vehicle speed sensor 16. The normal speed change control section 111 transmits a control signal to the linear solenoid valves SLC1, SLC2, SLC3, and SLB1 and so forth so that shifting to the adequate shift speed is performed at the timing when the adequate shift speed is changed by the routine. This causes the normal speed change control section 111 to control the speed change mechanism 5 to the adequate shift speed by achieving a combination of engaged state/disengaged state of the frictional engagement elements shown in the operation table of FIG. 3.

Figure 6:
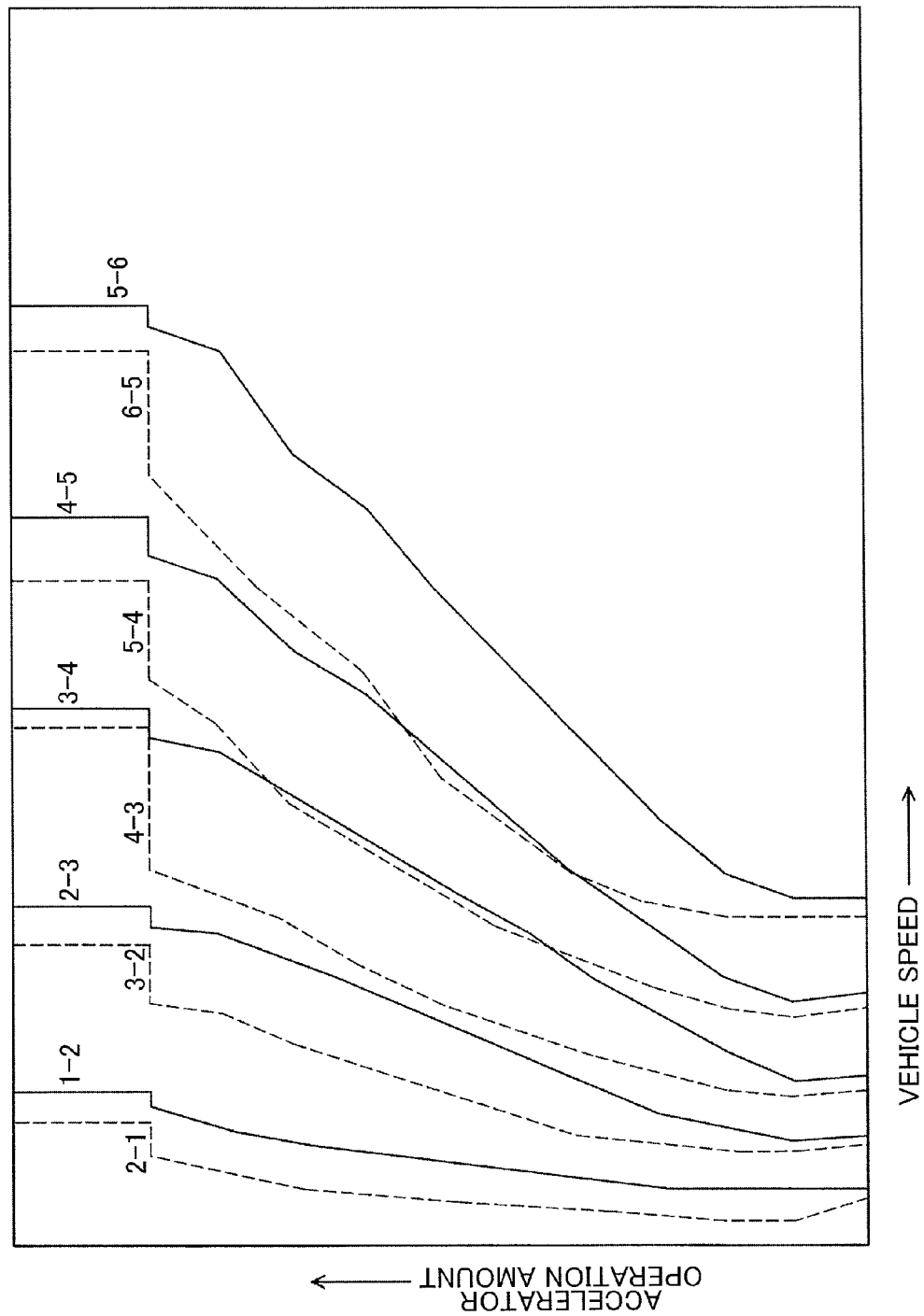
FIG. 6 is a schematic diagram showing an example of a speed change map 122.

FIG. 6 is a schematic diagram showing an example of the speed change map 122. The speed change map 122 is a map in which schedules for shifting between shift speeds in the speed change mechanism 5 are set on the basis of the accelerator operation amount and the vehicle speed. As shown in FIG. 6, the speed change map 122 includes a plurality of upshift lines and a plurality of downshift lines represented by lines generally inclined upward toward the right. The upshift lines are each a speed change line for determining whether or not to perform an upshift, which is a transition from a shift speed to a shift speed that is one step higher, in accordance with the accelerator operation amount and/or the vehicle speed. The upshift lines are shown by solid lines in FIG. 6. The downshift lines are each a speed change line for determining whether or not to perform a downshift, which is a transition from a shift speed to a shift speed that is one step lower, in accordance with the accelerator operation amount and/or the vehicle speed. The downshift lines are shown by broken lines in FIG. 6.

The neutral control section 112 can execute running neutral control. In the running neutral control, the speed change mechanism 5 is controlled to the neutral state in the case where coasting conditions to be described later are satisfied, even if the shift lever position is in the forward range (D range). In the neutral state, power transfer between the input shaft IN and the output shaft O1 is suppressed. The neutral state includes a state in which power transfer between the input shaft IN and the output shaft O1 is completely stopped and a state in which power transfer between the input shaft IN and the output shaft O1 is reduced compared to a state in which a normal shift speed is established.

The neutral control section 112 includes a neutral start control section 112a and a neutral termination control section 112b. The neutral start control section 112a executes neutral start control for transitioning the speed change mechanism 5 to the neutral state in the case where the coasting conditions are satisfied, by transitioning at least one frictional engagement element, of frictional engagement elements that have been brought in the engaged state to establish a shift speed of the speed change mechanism 5 that is established at the moment when the coasting conditions are satisfied, to the disengaged state. The neutral termination control section 112b executes neutral termination control for transitioning the speed change mechanism 5 from the neutral state to a state in which a normal shift speed is established in the case where termination conditions are satisfied with the speed change mechanism 5 brought in the neutral state by the neutral start control section 112a, by transitioning at least one frictional engagement element from the disengaged state to the engaged state. In the embodiment, it is determined that the termination conditions are satisfied in the case where at least one of the coasting conditions to be described later becomes unsatisfied. Control performed by the neutral control section 112 will be described in detail later.

The speed ratio specifying section 113 calculates a speed ratio that is actually achieved in the speed change mechanism 5 (hereinafter referred to as an "actual speed ratio") from the rotating speed of the input shaft IN and the rotating speed of the output shaft O1. The first failure determination section 114 determines whether or not a failure is occurring in the automatic transmission 10 on the basis of the actual speed ratio calculated by the speed ratio specifying section 113 during execution of the running neutral control described in detail later. Specifically, the first failure determination section 114 determines that a failure is occurring in the case where the actual speed ratio coincides with the speed ratio corresponding to any of the forward shift speeds that can be established in the speed change mechanism 5 (in the embodiment, the first to sixth speeds) over a predetermined time. In the case where the running neutral control is executed normally, the rotating speed of the input shaft IN and the rotating speed of the output shaft O1 vary sequentially in accordance with the engine speed and the wheel speed (vehicle speed), respectively, and independently of each other. Therefore, in the case where the running neutral control is executed normally, the actual speed ratio varies sequentially. Thus, in the case where the actual speed ratio coincides with the speed ratio corresponding to any of the forward shift speeds even though the running neutral control is executed, it is considered that an unintentional frictional engagement element is engaged because of a failure so that an unintentional shift speed is established in the speed change mechanism 5.

The second failure determination section 115 determines whether or not a failure is occurring in the automatic transmission 10 on the basis of the actual speed ratio calculated by the speed ratio specifying section 113 at a predetermined timing during execution of the normal speed change control. For example, the second failure determination section 115 determines whether or not a failure is occurring in the automatic transmission 10 at the timing when normal shifting is performed in the normal speed change control. The second failure determination section 115 further determines whether or not a failure is occurring in the automatic transmission 10 at the timing when the running neutral control is terminated to return to the normal speed change control, that is, after execution of the neutral termination control. The second failure determination section 115 determines that a failure is not occurring in the case where the speed ratio of a shift speed that should be established by control performed by the normal speed change control section 111 (hereinafter referred to as a "control speed ratio") coincides with the actual speed ratio over a predetermined time. On the other hand, the second failure determination section 115 determines that a failure is occurring in the case where the control speed ratio and the actual speed ratio do not coincide with each other over a predetermined time. Failure determinations performed by the first failure determination section 114 and the second failure determination section 115 will be described in further detail later.

The running state determination section 116 acquires information related to the running state of the vehicle from the various sensors described above to determine on the basis of the acquired information whether or not the coasting conditions are satisfied. In the embodiment, the running state determination section 116 determines that the coasting conditions are satisfied in the case where all the following conditions are satisfied. Meanwhile, the running state determination section 116 determines that the coasting conditions are not satisfied in the case where at least one of the following conditions is not satisfied.

1. The vehicle speed is a prescribed speed (for example, 60 km/h) or more.
2. The accelerator operation amount is zero (the accelerator pedal is not operated (depressed)).
3. The deceleration (negative acceleration) is a prescribed value or less.
4. The shift lever position is in the forward range (D range).
5. A failure (error) is not occurring in the engine 2 or the automatic transmission 10.

Condition 1 is determined from the vehicle speed detected by the vehicle speed 16. Instead, Condition 1 may be determined on the basis of the vehicle speed obtained through conversion from the rotating speed of the output shaft O1 of the speed change mechanism 5 detected by the output shaft speed sensor 13. The prescribed speed in Condition 1 is not set to a negative speed (reverse speed) or a stationary state (speed of 0), but set to a speed that may be reached when the vehicle runs forward from a stationary state.

Condition 2 is determined from the accelerator operation amount detected by the accelerator operation amount sensor 11. Instead, it may be determined that the accelerator operation amount is substantially zero in the case where a throttle valve of the engine 2 is opened to a degree of opening for idling.

In the case where Condition 1 and Condition 2 are satisfied (for example, in the case where the vehicle speed is 60 km or more and the accelerator operation amount is zero), the shift speed of the speed change mechanism 5 is a predetermined shift speed or higher (for example, the third forward speed or higher in the embodiment) as seen from the speed change map 122 of FIG. 6. Thus, the coasting conditions are met in the case where the speed change mechanism 5 is a predetermined shift speed or higher. A condition that the shift speed of the speed change mechanism 5 is a predetermined shift speed or higher (for example, the third forward speed or higher) may be included in the coasting conditions in addition to or in place of Condition 1.

Condition 3 may be determined from variations in rotating speed of the output shaft O1 detected by the output shaft speed sensor 13, or may be determined from variations in vehicle speed detected by the vehicle speed sensor 16. Alternatively, Condition 3 may be determined in accordance with whether or not the amount of depression from the brake pedal sensor 15 is a prescribed value or less. Still alternatively, Condition 3 may be determined in accordance with whether or not the actual braking pressure for brakes is a prescribed value or less.

Condition 4 is determined from the shift lever position detected by the shift lever sensor 14. In the case where Conditions 1 to 3 are satisfied and the shift lever position is not in the forward range, it is conceivable that the shift lever position is in the neutral range (N range). Condition 4 is provided because it is meaningless to perform the neutral control in such a case.

Condition 5 is set to suppress execution of special control in the case where a failure is occurring in the engine 2 or the automatic transmission 10.

In the embodiment, five conditions are set as the coasting conditions. However, it is only necessary that at least Condition 1, Condition 2, or conditions equivalent to these conditions should be set as necessary conditions, and other conditions may be omitted where appropriate.

In the case where the coasting conditions described above are satisfied, the vehicle is considered to be in the coasting state at a prescribed speed or more. In the coasting state, the vehicle is running utilizing dynamic energy (mainly kinetic energy, and including potential energy) that the vehicle has, without utilizing power (energy) output from the engine 2. In the coasting state, the state in which power transfer between the output shaft O1 and the input shaft IN is stopped (neutral state) is advantageous in terms of fuel efficiency because no energy loss due to a load of the torque converter 4 and the engine 2 (energy loss due to so-called engine brake) is caused in such a state. In the embodiment, in the case where the vehicle is in the coasting state at a prescribed speed or more, the running neutral control is executed to bring the speed change mechanism 5 into the neutral state in order to improve the fuel efficiency.

Meanwhile, there is also known so-called fuel cut control for stopping supply of fuel to the engine by maintaining rotation of the engine utilizing dynamic energy that the vehicle has, without bringing the speed change mechanism into the neutral state, in the case where the vehicle is in the coasting state. In case of applying the running neutral control to a vehicle on which the fuel cut control can also be executed, it is preferable to determine appropriate coasting conditions such that the running neutral control is performed in the case where performing the running neutral control is comprehensively advantageous in terms of fuel efficiency than performing the fuel cut control. For example, the prescribed speed in Condition 1 utilized by a vehicle having the fuel cut control function is preferably set to be higher than the prescribed speed in Condition 1 utilized by a vehicle not having the fuel cut control function.

Figure 7:
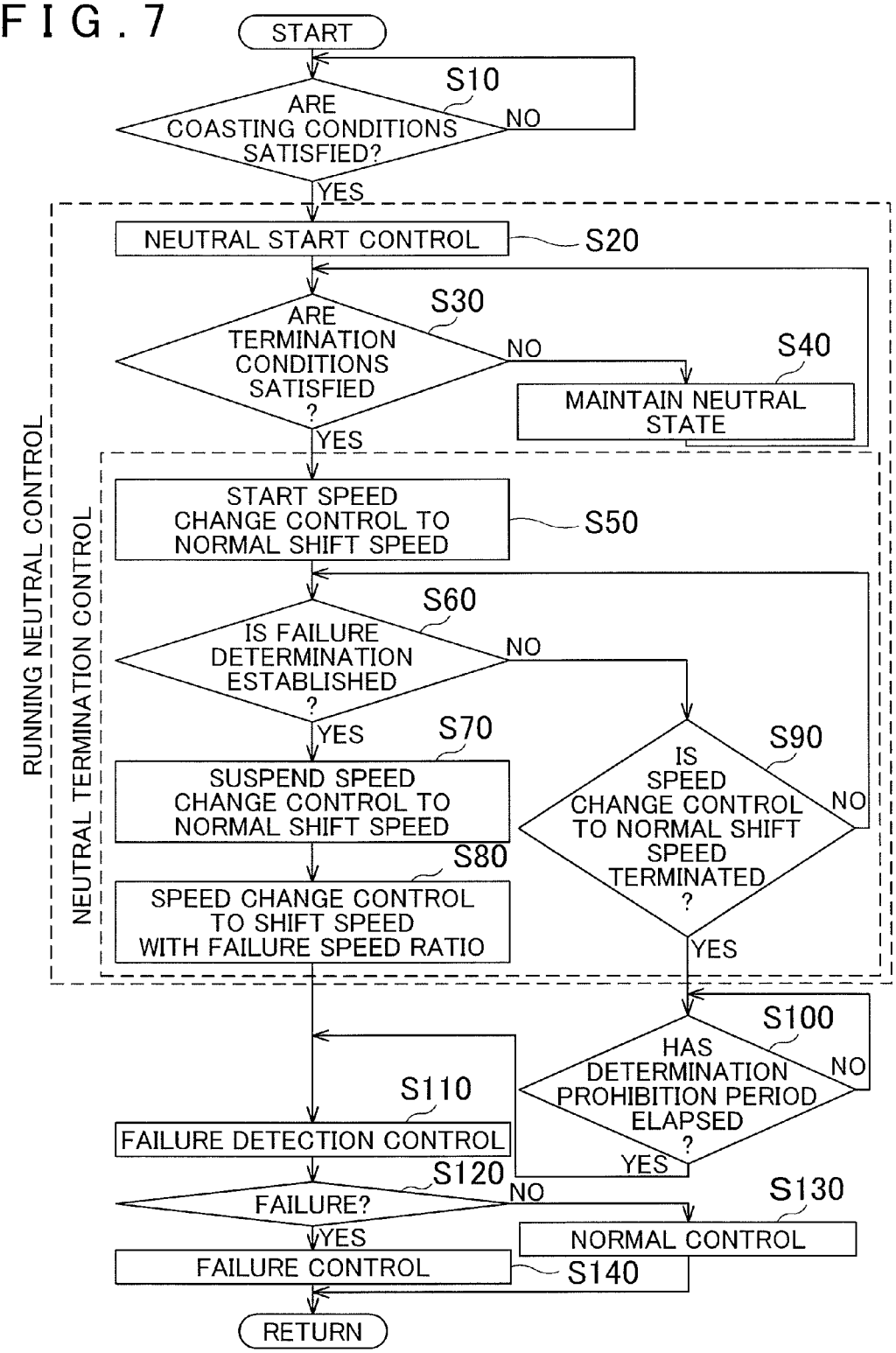
FIG. 7 is a flowchart showing steps for controlling the automatic transmission 10 performed by an ECU 100, mainly showing running neutral control according to the first embodiment.
Figure 8:
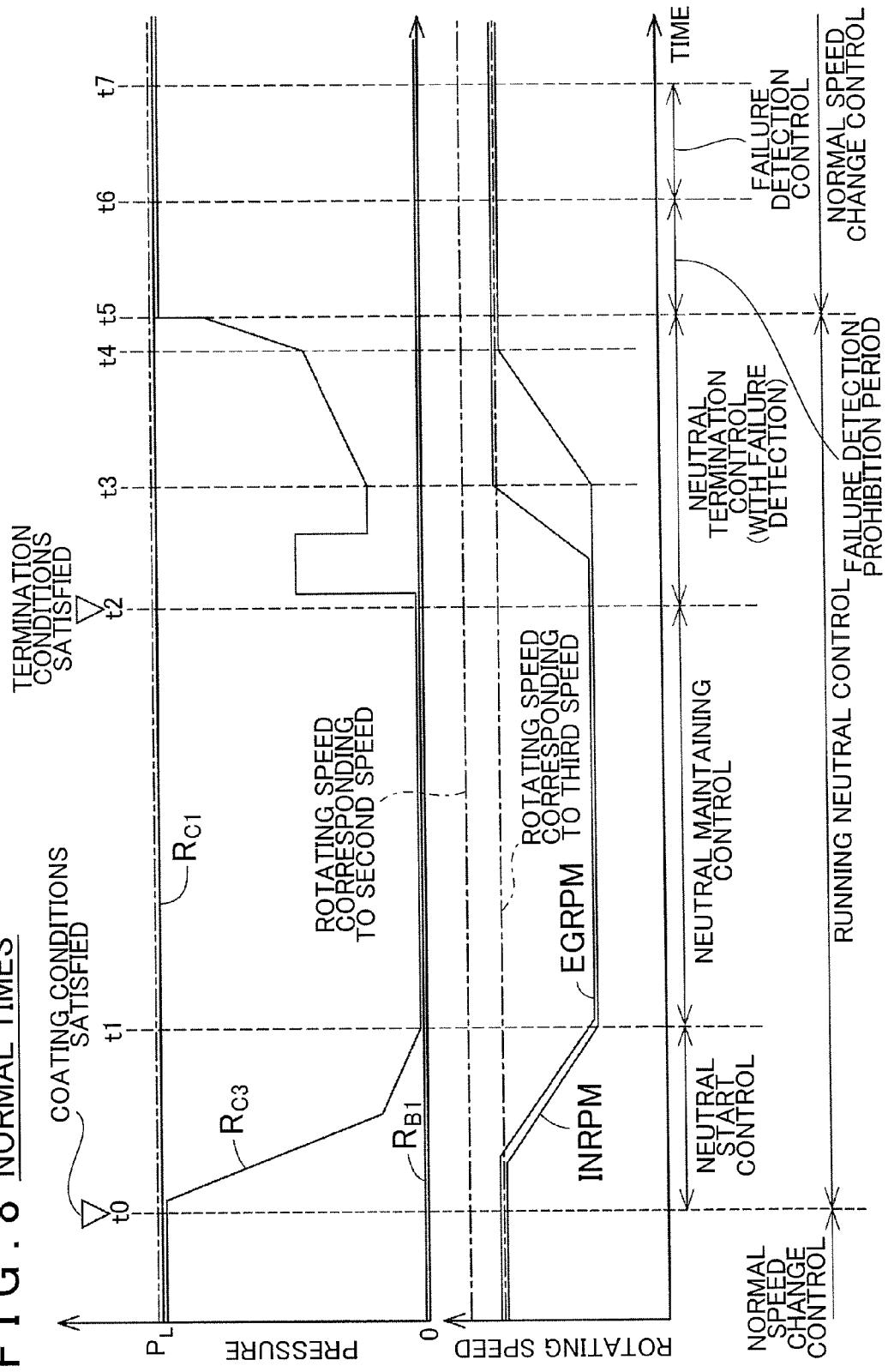
FIG. 8 is a timing chart illustrating the running neutral control according to the first embodiment in the case where the automatic transmission 10 is normal.
Figure 9:
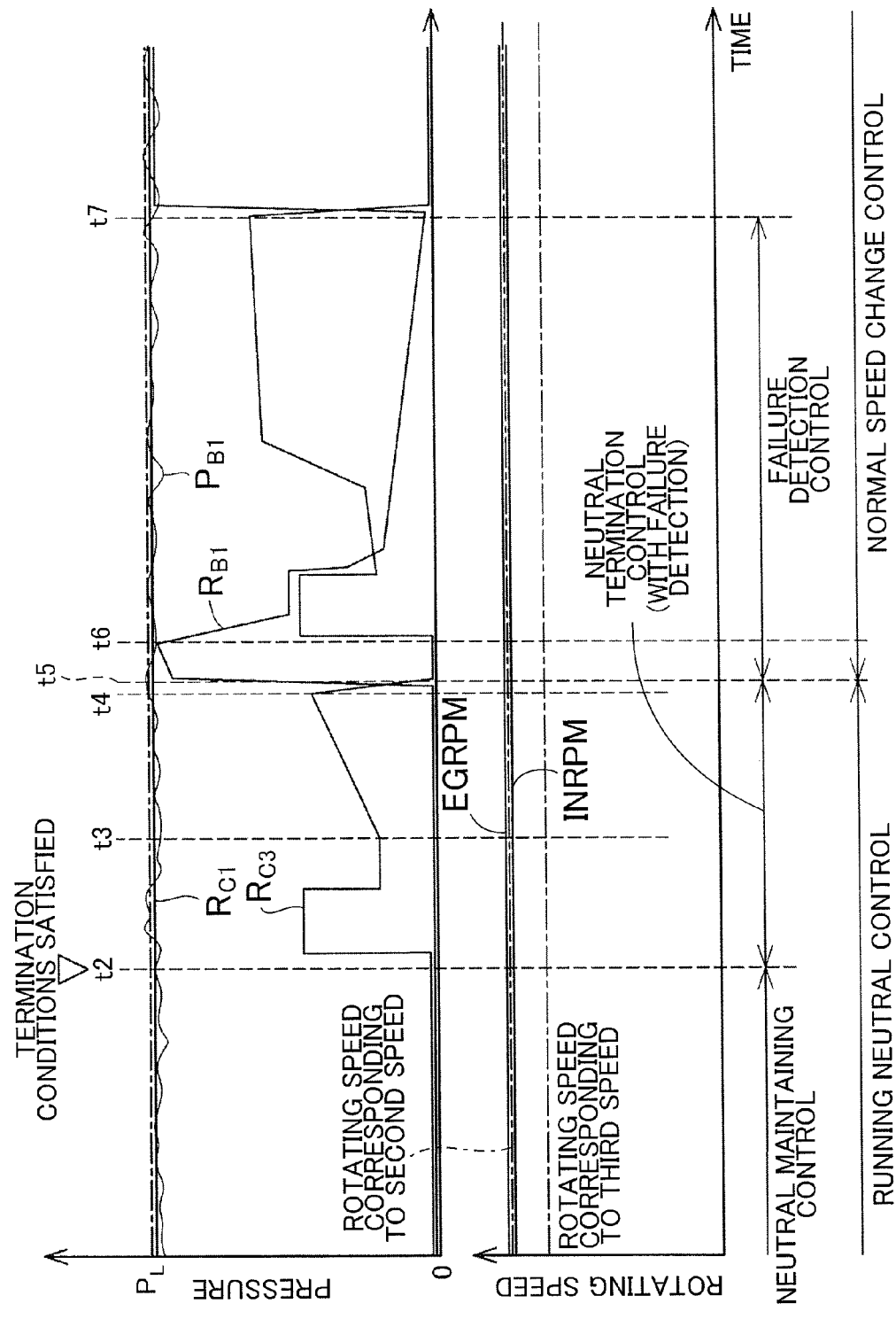
FIG. 9 is a timing chart illustrating the running neutral control according to the first embodiment in the case where a failure has occurred in the automatic transmission 10.

Next, the running neutral control will be described in detail. FIG. 7 is a flowchart showing steps for controlling the automatic transmission 10 performed by the ECU 100, mainly showing the running neutral control according to the first embodiment. FIG. 8 is a timing chart illustrating the running neutral control according to the first embodiment in the case where the automatic transmission 10 is normal. FIG. 9 is a timing chart illustrating the running neutral control according to the first embodiment in the case where a failure has occurred in the automatic transmission 10. FIGS. 8 and 9 show an exemplary case where the running neutral control is performed while the vehicle is running using the third forward speed and the vehicle returns to running using the third forward speed again after termination of the running neutral control.

In the upper portion of FIGS. 8 and 9 are shown request pressures $R_{C1}$, $R_{C3}$, and $R_{B1}$ that the ECU 100 commands the linear solenoid valves SLC1, SLC3, and SLB1, respectively, to output in order to control the control pressures $P_{C1}$, $P_{C3}$, and $P_{B1}$ for the hydraulic servos 61, 63, and 64 for the clutches C1 and C3 and the brake B1, respectively. Meanwhile, in the lower portion of FIGS. 8 and 9 are shown a rotating speed EGRPM of the crankshaft 21 of the engine 2 and a rotating speed INRPM of the input shaft IN of the speed change mechanism 5 in the case where it is assumed that the vehicle speed is constant. In the lower portion of FIGS. 8 and 9, the upper single-dotted broken line indicates the rotating speed of the crankshaft 21 and the input shaft IN in the case where the second speed is established in the speed change mechanism 5, and the lower single-dotted broken line indicates the rotating speed of the crankshaft 21 and the input shaft IN in the case where the third speed is established in the speed change mechanism 5. In FIG. 8, which is for normal times, the actual control pressures $P_{C1}$, $P_{C3}$, and $P_{B1}$ for the hydraulic servos 61, 63, and 64 follow the request pressures $R_{C1}$, $R_{C3}$, and $R_{B1}$, respectively, and therefore are not shown. In the control shown in FIG. 8, the brake B1 is constantly controlled to the disengaged state, and therefore the request pressure $R_{B1}$ is maintained at zero. In the example of FIG. 9, the brake B1 is constantly controlled to the disengaged state, but brought into the engaged state because of a failure. Therefore, in FIG. 9, while the request pressure $R_{B1}$ is maintained at zero, the control pressure $P_{B1}$ for the hydraulic servo 64 is equivalent to the line pressure $P_L$.

When the vehicle is running forward, the normal speed change control section 111 appropriately performs the normal speed change control in accordance with the running state of the vehicle, and the running state determination section 116 constantly determines whether or not the coasting conditions described above are satisfied as shown in step S10.

In the case where the running state determination section 116 determines that the coasting conditions are not satisfied (step S10: NO), the normal speed change control section 111 continues the normal speed change control. On the other hand, if the running state determination section 116 determines that the coasting conditions are satisfied (step S10: YES), the neutral start control section 112a of the neutral control section 112 executes the neutral start control (step S20).

In the example of FIG. 8, the coasting conditions are satisfied at time t0, and the neutral start control is performed during a period from time t0 to time t1. The neutral start control section 112a outputs the request pressure $R_{C3}$ as shown in FIG. 8 to reduce the control pressure $P_{C3}$ to be supplied to the hydraulic servo 63 for the clutch C3, of the clutches C1 and C3 which are the two frictional engagement elements which have been brought in the engaged state to establish the third forward speed, gently from a value equivalent to the line pressure $P_L$ to zero. As a result, the engagement force for the clutch C3 decreases to bring the clutch C3 from the engaged state into the disengaged state. As a result, power is no longer transferred from the output shaft O1 to the input shaft IN. As a result, the speed change mechanism 5 is brought into the neutral state. As a result, the rotating speed EGRPM of the crankshaft 21 of the engine 2 and the rotating speed INRPM of the input shaft IN of the speed change mechanism 5 decrease to an idling rotating speed. At this time, the clutch C1 is in the engaged state. However, the first forward speed is not established in the speed change mechanism 5 because the rotating speed of the output shaft O1 of the speed change mechanism 5 is sufficiently higher than the rotating speed of the input shaft IN and therefore the one-way clutch F1 does not exert its engaging action.

While a transition from the third forward speed to the neutral state has been described above, the neutral start control section 112a may allow a transition from any forward shift speed to the neutral state. That is, the neutral start control section 112a may allow a transition from a shift speed that is established at the moment when the coasting conditions are satisfied to the neutral state by controlling at least one of frictional engagement elements that have been engaged to establish the shift speed to the disengaged state. For example, in case of a transition from the sixth forward speed to the neutral state, the neutral start control section 112a controls the clutch C2, of the clutch C2 and the brake B1 which are the two frictional engagement elements which have been brought in the engaged state to establish the sixth forward speed, to the disengaged state.

After the neutral start control is terminated and the speed change mechanism 5 is brought into the neutral state, the running state determination section 116 keeps monitoring whether or not the termination conditions are satisfied (step S30). While the termination conditions are not satisfied, the neutral control section 112 maintains the speed change mechanism 5 in the neutral state (step S30: NO, step S40). In the example of FIG. 8, the speed change mechanism 5 is maintained in the neutral state during a period from time t1 to time t2 (neutral maintaining control). In the embodiment, the running state determination section 116 determines that the termination conditions are satisfied in the case where at least one of the coasting conditions described above becomes unsatisfied.

If the running state determination section 116 determines that the termination conditions are satisfied (step S30: YES), the neutral termination control section 112b executes the neutral termination control. Specifically, the neutral termination control section 112b starts normal-shift-speed speed change control for shifting the speed change mechanism 5 to a normal shift speed (step S50). The normal shift speed is determined with reference to the speed change map 122 (FIG. 6) on the basis of the accelerator operation amount and the vehicle speed at the start of execution of the neutral termination control (time t2 of FIG. 8). Specifically, while the neutral control is performed, the ECU 100 repeatedly performs a routine for determining an adequate shift speed using the same algorithm as that used in the case where the normal speed change control is performed. The neutral termination control section 112b determines the adequate shift speed determined by the routine at time t2 as the normal shift speed to which shifting is performed in the neutral termination control. In the example shown in FIG. 8, the third forward speed is determined as the normal shift speed. Thus, in the example shown in FIG. 8, the normal-shift-speed speed change control is executed by transitioning the clutch C3 from the disengaged state to the engaged state to cause the speed change mechanism 5 to establish the third forward speed through the clutch C3 and the clutch C1 which has already been in the engaged state.

In the first half of the normal-shift-speed speed change control (FIG. 8: time t2 to time t3), a piston of the hydraulic servo 63 for the clutch C3 is moved to a position immediately before engagement of the frictional engagement element (to a position in the vicinity of a stroke end of the piston), and the neutral termination control section 112b sharply increases the request pressure $R_{C3}$, maintains the request pressure $R_{C3}$ at a high value for a while, and thereafter temporarily reduces the request pressure $R_{C3}$. Generally during a period from time t2 to time t3, in order to suppress a speed change shock, the rotating speed EGRPM of the engine 2 is controlled to a value corresponding to the speed ratio of the third forward speed with respect to the rotating speed of the output shaft O1.

In the second half the normal-shift-speed speed change control (FIG. 8: time t3 to time t4), the neutral termination control section 112b gently increases the request pressure $R_{C3}$ for the control pressure $P_{C3}$ for the hydraulic servo 63 to engage the clutch C3. Then, the neutral termination control section 112b sharply increases the request pressure $R_{C3}$ from the time when the rotating speed INRPM of the input shaft IN reaches a value corresponding to the speed ratio of the third forward speed to completely engage the clutch C3 (FIG. 8: time t4 to time t5). By controlling the control pressure $P_{C3}$ for the clutch C3 in accordance with the request pressure $R_{C3}$ in this way, the clutch C3 can be quickly engaged while suppressing a speed change shock.

While the neutral termination control section 112b executes the normal-shift-speed speed change control, the first failure determination section 114 performs a failure determination on the automatic transmission 10 (steps S60 and S90). Specifically, as described above, the first failure determination section 114 determines that the failure determination is established (a failure is occurring) in the case where the actual speed ratio coincides with the speed ratio corresponding to any of the forward shift speeds (the first to sixth speeds) over a predetermined time (step S60). If the normal-shift-speed speed change control is terminated without the first failure determination section 114 determining that a failure is occurring (step S90: YES), the neutral termination control is terminated at this moment to transition to the normal speed change control (FIG. 8: at and after time t5).

In the normal speed change control, the second failure determination section 115 determines whether or not a failure is occurring in order to avoid unintentional engagement of an engagement element each time shifting is performed. In the embodiment, the second failure determination section 115 determines whether or not a failure is occurring also in the case where shifting is performed from the neutral state to the normal shift speed. Specifically, first, the second failure determination section 115 stands by until a predetermined determination prohibition period elapses (step S100, S100: NO). A period from time t5 to time t6 in FIG. 8 corresponds to the determination prohibition period. The determination prohibition period is provided to wait for the speed ratio, which may fluctuate because of a speed change shock immediately after shifting, to be stabilized in order to improve the determination accuracy of the failure determination.

When the determination prohibition period has elapsed (step S100: YES), the second failure determination section 115 executes failure determination control (step S110, FIG. 8: time t6 to time t7). Specifically, the second failure determination section 115 calculates the actual speed ratio from the respective rotating speeds of the input shaft IN and the output shaft O1, and determines whether or not the actual speed ratio coincides with a desired control speed ratio over a predetermined determination period. If the second failure determination section 115 determines that a failure is occurring in the automatic transmission 10 (step S120: YES) as a result of the above determination, the ECU 100 executes failure control (step S140). In the failure control, speed change control is performed to establish a shift speed corresponding to the actual speed ratio, and a lamp is lit up to inform a driver of the failure, for example.

On the other hand, if the second failure determination section 115 determines that a failure is not occurring in the automatic transmission 10 (the automatic transmission 10 is normal) (step S120: NO) as a result of the above determination, the ECU 100 executes the normal control (step S130). In the normal control, the normal speed change control is continued without executing special control, for example.

Next, a case where a failure has occurred will be described in detail with reference to FIGS. 7 and 9. In FIG. 9, the neutral start control of the running neutral control is not shown, and the neutral maintaining control and subsequent controls are shown. In FIG. 9, as described above, the actual control pressure $P_{B1}$ for the hydraulic servo 64 for the brake B1 is equivalent to the line pressure $P_L$ because of a failure, even though the request pressure $R_{B1}$ for the hydraulic servo 64 for the brake B1 is zero (which commands a disengaged state). In the neutral start control, the clutch C1 is not disengaged but maintained in the engaged state. As a result, with a combination of the brake B1 unintentionally brought in the engaged state and the clutch C1 intentionally brought in the engaged state, the second forward speed is established in the speed change mechanism 5 even during the neutral maintaining control. Thus, as shown in the lower portion of FIG. 9, the rotating speed EGRPM of the engine 2 and the rotating speed INRPM of the input shaft IN are at respective values corresponding to the speed ratio of the second forward speed with respect to the rotating speed of the output shaft O1. The speed ratio of a shift speed that is established in this way because of a failure even during the neutral control, which is any of the shift speeds that can be established in the speed change mechanism 5, is referred to as a "failure speed ratio".

When determining whether or not the actual speed ratio coincides with the speed ratio corresponding to any of the forward shift speeds (first to sixth speeds) over a predetermined time in step S60, for example, such shift speeds that may be established by a combination of the frictional engagement element which is not disengaged but maintained in the engaged state in the neutral start control and other frictional engagement elements may be determined so that the speed ratios corresponding to the determined shift speeds are used as candidates for comparison for determining whether or not any of the candidate speed ratios coincides with the actual speed ratio (see FIG. 3). In the embodiment, for example, a transition is made from a state in which the clutches C1 and C3 are engaged (third forward speed) to the neutral state by disengaging the clutch C3, and thus the speed ratios of shift speeds established by a combination of the clutch C1 and other frictional engagement elements (second to forth forward speeds) are used as candidates for comparison for determining coincidence with the actual speed ratio. In this way, it is possible to narrow down candidate speed ratios used for comparison for determining coincidence with the actual speed ratio, and therefore to quickly determine whether or not a failure is occurring.

In case of the example shown in FIG. 9, even when the neutral termination control section 112b starts the normal-shift-speed speed change control described above (step S50, FIG. 9: time t2), the rotating speed EGRPM of the engine 2 and the rotating speed INRPM of the input shaft IN do not vary to respective values corresponding to the speed ratio of the third forward speed, but are stationary at respective values corresponding to the speed ratio of the second forward speed. As a result, in the failure determination for the automatic transmission 10 described above (step S60) performed by the first failure determination section 114 during execution of the normal-shift-speed speed change control, it is determined that the actual speed ratio and the speed ratio of the second forward speed coincide with each other over a predetermined time, and it is determined that the failure determination is established (a failure is occurring) (step S60: YES).

If the first failure determination section 114 determines that the failure determination is established (step S60: YES), the neutral termination control section 112b suspends the normal-shift-speed speed change control (step S70), and performs the speed change control to the shift speed with the failure speed ratio (step S80). In the example of FIG. 9, during a period from time t4 to time t5, the speed change control to the normal shift speed (in the example of FIG. 9, third forward speed) is suspended, and the speed change control to the shift speed with the failure speed ratio (in the example of FIG. 9, second forward speed) is performed. That is, the neutral termination control section 112b quickly decreases the request pressure $R_{C3}$ for the hydraulic servo 63 for the clutch C3 to zero, and quickly increases the request pressure $R_{B1}$ for the hydraulic servo 64 for the brake B1 from zero to a value equivalent to the line pressure $P_L$. At the moment when the speed change control to the shift speed with the failure speed ratio is terminated (FIG. 9: time t5), the neutral termination control is terminated to transition to the normal speed change control.

In the normal speed change control, as during the normal times described above, failure detection control for determining whether or not a failure is occurring is performed. In this event, in the embodiment, the second failure determination section 115 quickly executes the failure detection control (step S110) without providing the determination prohibition period described above during failure times, unlike during the normal times. This is because it is highly probable that the shift speed corresponding to the failure speed ratio has been established in the speed ratio 5 because of a failure since before the speed change control to the shift speed corresponding to the failure speed ratio is performed in step S80, and therefore it is less necessary to consider fluctuations in speed ratio due to a speed change shock, and it is strongly requested to quickly determine whether or not a failure is occurring.

The failure detection control in the normal speed change control performed after the neutral termination control is terminated by the speed change control to the shift speed with the failure speed ratio is performed by observing the actual speed ratio while performing the speed change control from the shift speed with the failure speed ratio to another shift speed (in the embodiment, third forward speed as the normal shift speed), unlike during the normal times. In the example of FIG. 9, the ECU 100 performs control for shifting from the second forward speed to the third forward speed, that is, control for increasing the request pressure $R_{C3}$ for the hydraulic servo 63 for the clutch C3 and decreasing the request pressure $R_{B1}$ for the hydraulic servo 64 for the brake B1, from time t6.

In the case where the actual speed ratio is maintained at the failure speed ratio (in the example of FIG. 9, the speed ratio of the second forward speed) during the speed change control, the second failure determination section 115 finally determines that a failure is occurring in the automatic transmission 10 (step S120: YES). If it is finally determined that a failure is occurring in the automatic transmission 10, the ECU 100 executes the failure control (step S120). In the failure control performed in this case, the ECU 100 performs the speed change control to the shift speed corresponding to the failure speed ratio, and prohibits subsequent execution of the running neutral control irrespective of whether or not the coasting conditions are satisfied, for example. The ECU 100 also lights up the lamp to inform the driver of the failure. In the example of FIG. 9, the ECU 100 performs control for quickly decreasing the request pressure $R_{C3}$ for the hydraulic servo 63 for the clutch C3 and quickly increasing the request pressure $R_{B1}$ for the hydraulic servo 64 for the brake B1 at time t7 as control for shifting to the second forward speed which is the shift speed corresponding to the failure speed ratio.

On the other hand, in the case where the actual speed ratio has varied from the failure speed ratio to the speed ratio corresponding to the normal shift speed in accordance with the speed change control during the speed change control described above, the second failure determination section 115 determines that a failure is not occurring in the automatic transmission 10 (step S120: NO). If it is determined that a failure not is occurring in the automatic transmission 10, the ECU 100 executes the normal control (step S130). In the normal control, the ECU 100 continues the speed change control to the normal shift speed until the end, for example. For example, although not shown, the ECU 100 performs control for quickly increasing the request pressure $R_{C3}$ for the hydraulic servo 63 for the clutch C3 to a value equivalent to the line pressure $P_L$ and quickly decreasing the request pressure $R_{B1}$ for the hydraulic servo 64 for the brake B1 at and after time t7 in FIG. 9 to complete the speed change control to the third forward speed.

As understood from the above description, the failure determination performed by the first failure determination section 114 in step S60 is a preliminary failure determination, and the failure detection performed by the second failure determination section 115 in step S110 is a final failure determination. The failure determination performed by the second failure determination section 115 may be omitted, and the measures against a failure may be taken in the case where it is determined that a failure is occurring in the failure determination performed by the first failure determination section 114. The measures against a failure may include performing the speed change control to the shift speed corresponding to the failure speed ratio as described above, and lighting up the lamp to inform the driver of the failure in addition to or in place of performing the speed change control to the shift speed corresponding to the failure speed ratio.

According to the embodiment described above, the running neutral control is executed while the coasting conditions described above are satisfied. Thus, the fuel efficiency of the vehicle can be improved by suppressing consumption of the kinetic energy of the vehicle by rotation of the torque converter or engine brake. Further, a failure in the automatic transmission 10 can be determined at least on the basis of the actual speed ratio calculated from the rotating speed of the input shaft IN and the rotating speed of the output shaft O1 during the running neutral control. Thus, the failure control can be performed in the case where a failure occurs in the automatic transmission 10 during the running neutral control. Thus, unintentional engagement of a frictional engagement element can be avoided. As a result, it is possible to suppress wear of a frictional engagement element, deceleration of the vehicle, and so forth due to unnecessary slip of a frictional engagement element, and to improve the durability of the automatic transmission and the drivability of the vehicle.

Further, the failure determination during the running neutral control is performed in accordance with whether or not the actual speed ratio coincides with the speed ratio of any one of the shift speeds that can be established in the speed change mechanism 5 over a predetermined period. Thus, it is possible to appropriately detect a failure in which the speed ratio during the running neutral control, which would normally vary sequentially, is kept at the speed ratio of one shift speed because of unintentional engagement of a frictional engagement element.

Further, in the case where it is determined that a failure is occurring during the running neutral control, shifting is performed in the automatic transmission 10 to establish the shift speed corresponding to the failure speed ratio. As a result, it is possible to avoid a command for shifting to a shift speed that is different from the shift speed corresponding to the actual speed ratio from being issued even though a failure is occurring, and hence to avoid occurrence of unintentional engagement of a frictional engagement element. For example, it is assumed that in the case where the second speed is unintentionally established in the speed change mechanism 5 with the clutch C1 and the brake B1 engaged because of a failure, a command for shifting to the third speed, which is established by engaging the clutch C3 which is different from the two frictional engagement elements mentioned above, is issued. Then, the clutch C3 is engaged in addition to the clutch C1 and the brake B1 so that one of the three frictional engagement elements may slip. According to the present configuration, in the case where the second speed is unintentionally established because of a failure, for example, a command for shifting to the second speed is issued. Therefore, the actually established shift speed coincides with the shift speed according to the command for shifting. As a result, it is possible to avoid unintentional engagement of a frictional engagement element, and hence slip of a frictional engagement element described above. Thus, it is possible to suppress wear of a frictional engagement element, deceleration of the vehicle, and so forth due to unnecessary slip of a frictional engagement element.

Further, in the case where the first failure determination section 114 determines that the failure speed ratio is continued over a predetermined period in step S60 in the neutral termination control, the second failure determination section 115 performs the failure detection control without waiting for a standby period (determination prohibition period) to elapse in step S110 in the subsequent normal speed change control. Thus, it is possible to quickly determine whether or not a failure is occurring in the automatic transmission 10.

Further, the first failure determination section determines whether or not a failure is occurring during execution of the neutral termination control in the running neutral control. Thus, the normal shift speed can be immediately established in the automatic transmission 10 in the case where a failure is not occurring and the termination conditions are satisfied to terminate the neutral control. For example, it is possible to immediately establish the normal shift speed in the automatic transmission 10 compared to a case where it is determined whether or not a failure is occurring in the case where the termination conditions are satisfied and thereafter the neutral termination control is performed (which corresponds to a first modification to be described later). In addition, the first failure determination section 114 determines whether or not a failure is occurring during execution of the neutral termination control. Thus, measures against a failure (specifically, shifting to the shift speed corresponding to the failure speed ratio) may be taken at the moment when it is determined that a failure is occurring, and therefore complication of control can be suppressed. For example, in the case where it is determined whether or not a failure is occurring during control to the neutral state and measures against a failure are taken after the termination conditions are satisfied (which corresponds to a second modification to be described later), a scheme for storing the failure determination results (specifically, a flag or the like) is required, which may complicates control. According to the embodiment, however, such complication can be suppressed.

B. Second Embodiment

Figure 10:
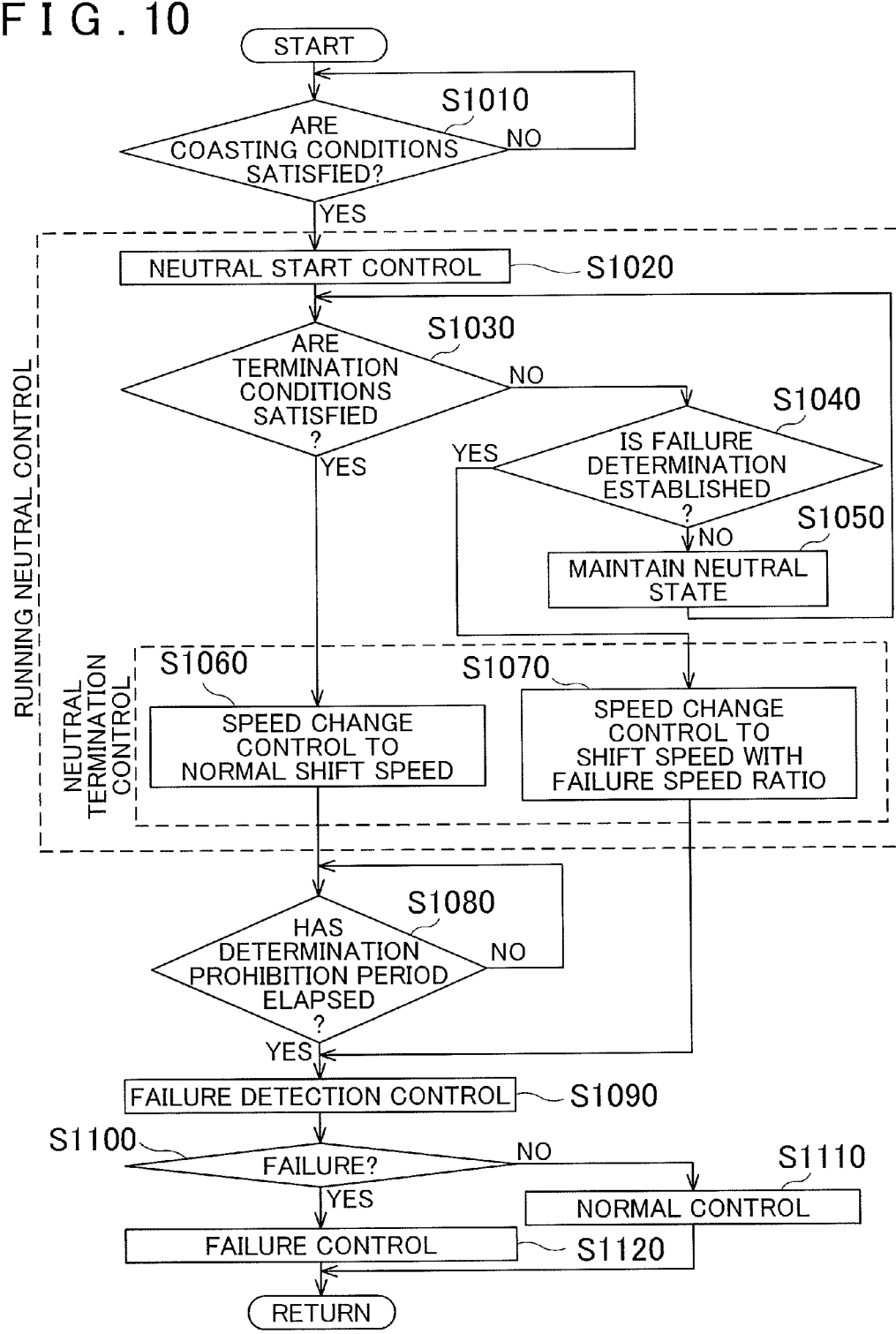
FIG. 10 is a flowchart showing steps for controlling the automatic transmission 10 performed by the ECU 100, mainly showing running neutral control according to a second embodiment.

Next, another embodiment of the running neutral control will be described as a second embodiment. FIG. 10 is a flowchart showing steps for controlling the automatic transmission 10 performed by the ECU 100, mainly showing the running neutral control according to the second embodiment. FIG. 11 is a timing chart illustrating the running neutral control according to the second embodiment in the case where a failure has occurred in the automatic transmission 10.

Control performed in steps S1010 and S1020 (FIG. 10) according to the second embodiment is the same as control performed in steps S10 and S20 (FIG. 7) according to the first embodiment, and thus will not be described.

After the neutral start control in step S1020 is terminated and the speed change mechanism 5 is brought into the neutral state, the running state determination section 116 keeps monitoring whether or not the termination conditions are satisfied (step S1030), and the first failure determination section 114 performs a failure determination for the automatic transmission 10 (step S1040). The failure determination is performed in accordance with whether or not the actual speed ratio coincides with the speed ratio of any one of the shift speeds that can be established in the speed change mechanism 5 over a predetermined period, as in the first embodiment.

While it is determined that the termination conditions are not satisfied (step S1030: NO) and it is determined that the failure determination is not established (a failure is not occurring) (step S1040: NO), the speed change mechanism 5 is maintained in the neutral state (step S1050).

If the running state determination section 116 determines that the termination conditions are satisfied (step S1030: YES), the neutral termination control section 112b executes the speed change control to the normal shift speed as the neutral termination control (step S1060). The normal shift speed is determined with reference to the speed change map 122 (FIG. 6) on the basis of the accelerator operation amount and the vehicle speed, as in the first embodiment.

If the first failure determination section 114 determines that the failure determination is satisfied (a failure is occurring) (step S1040: YES), the neutral termination control section 112b executes the speed change control to the shift speed corresponding to the failure speed ratio as the neutral termination control (step S1070).

That is, in the running neutral control according to the second embodiment, in the case where the termination conditions are satisfied when control to the neutral state is performed, the speed change control to the normal shift speed is performed to terminate the running neutral control. Meanwhile, in the case where it is determined that a failure is occurring when control to the neutral state is performed, the speed change control to the shift speed corresponding to the failure speed ratio is executed to terminate the running neutral control.

Processes performed after the running neutral control according to the second embodiment is terminated (FIG. 10: steps S1080 to S1120) are the same as processes performed after the running neutral control according to the first embodiment is terminated (FIG. 7: steps S100 to S140), and thus will not be described.

A case where no failure has occurred in the running neutral control according to the second embodiment described above is the same as a case where no failure has occurred in the running neutral control according to the first embodiment (FIG. 8), and thus will not be described. A case where a failure has occurred in the running neutral control according to the second embodiment will be described below with reference to the timing chart of FIG. 11.

In FIG. 11, during the neutral maintaining control, the actual control pressure $P_{B1}$ for the hydraulic servo 64 for the brake B1 starts sharply increasing because of a failure from time t2 to be equivalent to the line pressure $P_L$ at time t3, even though the request pressure $R_{B1}$ for the hydraulic servo 64 for the brake B1 is zero (which commands a disengaged state). As a result, the second forward speed is established in the speed change mechanism 5 at the moment of time t3, even during the neutral maintaining control. Thus, as shown in the lower portion of FIG. 11, the rotating speed EGRPM of the engine 2 and the rotating speed INRPM of the input shaft IN are varied to respective values corresponding to the speed ratio of the second forward speed with respect to the rotating speed of the output shaft O1 during a period from time t2 to time t3.

In the example shown in FIG. 11, the actual speed ratio is stationary at the speed ratio of the second forward speed during a period from time t3 to time t4. As shown in FIG. 4, the first failure determination section 114 determines that the failure determination is satisfied (a failure is occurring) (step S1040: YES) at the moment of time t4, and the neutral termination control section 112b performs the speed change control to the shift speed corresponding to the failure speed ratio (in the embodiment, second forward speed) as the neutral termination control (step S1070) during a period from time t4 to time t5. That is, the neutral termination control section 112b quickly increases the request pressure $R_{B1}$ for the hydraulic servo 64 for the brake B1 from zero to be equivalent to the line pressure $P_L$. At the moment when the speed change control to the shift speed with the failure speed ratio is terminated (FIG. 11: time t5), the neutral termination control is terminated to transition to the normal speed change control. Control performed after the transition to the normal speed change control (FIG. 11: at and after time t5) is the same as that according to the first embodiment (FIG. 9: at and after time t5), and thus will not be described.

According to the second embodiment described above, determination of a failure is performed during the neutral maintaining control, and in the case where it is determined that a failure is occurring, the neutral termination control is quickly performed to terminate the running neutral control and transition to the normal speed change control. Thus, the running neutral control can be quickly terminated in the case where the automatic transmission 10 is unintentionally in a state in which any shift speed is established in the speed change mechanism 5 even though the neutral maintaining control is performed. Then, the control speed ratio and the actual speed ratio are caused to coincide with each other by performing control for shifting to the shift speed with the failure speed ratio, avoiding slip of a frictional engagement element produced by unintentional engagement of a frictional engagement element.

According to the second embodiment, further, in the case where it is determined that a failure is occurring in the automatic transmission 10 during the running neutral control, shifting to the shift speed with the failure speed ratio is performed to terminate the running neutral control without starting the speed change control to the normal shift speed. As a result, shifting to the shift speed with the failure speed ratio can be quickly performed to terminate the running neutral control without producing a hydraulic pressure for a frictional engagement element for the speed change control to the normal shift speed. For example, while a hydraulic pressure for a frictional engagement element is produced for the speed change control to the normal shift speed from time t2 to time t4 of FIG. 9 in the first embodiment, such a hydraulic pressure is not produced in the second embodiment (FIG. 11).

C. Modifications

Of the constituent elements in the above embodiments, elements other than those claimed in independent claims are additional elements, and may be omitted where appropriate. The present invention is not limited to the above examples and embodiments, and may be implemented in a variety of forms without departing from the scope of the present invention. For example, the present invention may be modified as described below.

First Modification

In the running neutral control (FIG. 7) according to the above first embodiment, in the case where the termination conditions are satisfied during the neutral maintaining control (FIG. 7: step S30: YES), the speed change control to the normal shift speed is started (FIG. 7: step S50), and a failure determination by the first failure determination section 114 is performed (FIG. 7: step S60) during the speed change control to the normal shift speed. Instead, in the case where the termination conditions are satisfied during the neutral maintaining control, a failure determination by the first failure determination section 114 may be performed before the speed change control to the normal shift speed is started.

In this case, in the case where it is determined that a failure is occurring as a result of the failure determination performed by the first failure determination section 114, the speed change control to the shift speed corresponding to the failure speed ratio is performed without starting the speed change control to the normal shift speed. Meanwhile, in the case where it is determined that a failure is not occurring, the speed change control to the normal shift speed is performed.

The first modification is advantageous in not requiring complicated control, which includes once starting the speed change control to the normal shift speed, suspending the speed change control to the normal shift speed, and performing the speed change control to the shift speed corresponding to the failure speed ratio, in the case where a failure is occurring. That is, according to the first modification, in the case where a failure is occurring, the speed change control to the shift speed corresponding to the failure speed ratio can be performed without starting the speed change control to the normal shift speed. Thus, shifting to the shift speed with the failure speed ratio can be quickly performed to terminate the running neutral control without producing a hydraulic pressure for a frictional engagement element for the speed change control to the normal shift speed.

Second Modification

In the running neutral control (FIG. 10) according to the above second embodiment, the failure determination by the first failure determination section 114 is performed during the neutral maintaining control (FIG. 10: step S1040), and in the case where it is determined that a failure is occurring (FIG. 10: step S1040: YES), shifting to the shift speed corresponding to the failure speed ratio is performed (FIG. 10: step S1070: YES) to quickly terminate the running neutral control irrespective of whether or not the termination conditions are satisfied. Instead, the failure determination by the first failure determination section 114 may be performed during the neutral maintaining control, and in the case where it is determined that a failure is occurring, the fact that a failure is occurring may be stored using a flag or the like, and shifting to the shift speed corresponding to the failure speed ratio may be performed after the termination conditions are satisfied.

Then, in the case where the termination conditions are satisfied without determination of a failure, shifting to the normal shift speed may be performed. The second modification is advantageous, as with the first modification, in not requiring complicated control, which includes starting the speed change control to the normal shift speed, suspending the speed change control to the normal shift speed, and performing the speed change control to the shift speed corresponding to the failure speed ratio.

Third Modification

In the above embodiments, in transitioning from a state in which the third forward speed is established through engagement of the clutches C1 and C3 to the neutral state, for example, the neutral state is established by disengaging only the clutch C3 and keeping the clutch C1 engaged. However, the present invention is not limited thereto. The neutral state may be established by disengaging both the clutches C1 and C3. In the above embodiments, also, the control pressure $P_{C3}$ for the clutch C3 is brought to zero in the neutral state. However, the control pressure $P_{C3}$ for the clutch C3 may be set to a standby pressure. The standby pressure is a control pressure that moves a piston in a hydraulic servo to a position immediately before the piston applies an engagement pressure to clutch plates. In this way, the speed change mechanism 5 can be quickly returned from the neutral state to a state in which a normal shift speed is established. The neutral state is not limited to a state in which power transfer between the input shaft IN and the output shaft O1 is stopped, and may be a state in which power transfer between the input shaft IN and the output shaft O1 is suppressed with a control pressure for at least one frictional engagement element reduced to such a degree that enables the frictional engagement element to moderately slip.

The present invention may be suitably applied to a control device for an automatic transmission that can establish a plurality of shift speeds with different speed ratios.

What is claimed is:

1. A control device for an automatic transmission that is disposed in a power transfer path from a drive source of a vehicle to drive wheels, that includes a plurality of frictional engagement elements, an input shaft, and an output shaft, and that can establish a plurality of predetermined shift speeds that are different in speed ratio in accordance with an engagement state of the plurality of frictional engagement elements, the speed ratio being a ratio between a rotating speed of the input shaft and a rotating speed of the output shaft, the control device comprising:

a neutral control unit that executes neutral control for bringing the automatic transmission into a neutral state by reducing an engagement force for an engaged frictional engagement element in the case where running conditions are satisfied, the neutral state being a state in which power transfer between the input shaft and the output shaft is suppressed, and the running conditions including an accelerator of the vehicle not being operated in a state in which the vehicle is running forward and in a state in which any one of the plurality of predetermined shift speeds is established;

a speed ratio specifying unit that specifies an actual speed ratio of the automatic transmission on the basis of the rotating speed of the input shaft and the rotating speed of the output shaft; and a first failure determination unit that determines whether or not a failure is occurring in the automatic transmission on the basis of the actual speed ratio during execution of the neutral control, wherein the first failure determination unit determines that a failure is occurring in the automatic transmission during the neutral state when the actual speed ratio coincides with the speed ratio of any one of the plurality of predetermined shift speeds over a predetermined time.

2. The control device for an automatic transmission according to claim 1, wherein:
the neutral control unit includes a first neutral termination control unit that executes neutral termination control for shifting the automatic transmission to any one of the plurality of predetermined shift speeds in the case where termination conditions are satisfied during execution of the neutral control; and
the first failure determination unit determines whether or not a failure is occurring in the automatic transmission during execution of the neutral termination control.

3. The control device for an automatic transmission according to claim 2, wherein:
in the case where it is determined by the first failure determination unit that a failure is not occurring, the first neutral termination control unit shifts the automatic transmission to a shift speed, of the plurality of predetermined shift speeds, that is determined on the basis of an operation amount of the accelerator and a vehicle speed of the vehicle; and
in the case where it is determined by the first failure determination unit that a failure is occurring, the first neutral termination control unit shifts the automatic transmission to a shift speed, of the plurality of predetermined shift speeds, that corresponds to the actual speed ratio.

4. The control device for an automatic transmission according to claim 3, further comprising:
a second failure determination unit that determines whether or not a failure is occurring in the automatic transmission after execution of the neutral termination control, wherein
in the case where it is determined by the first failure determination unit that a failure is not occurring, the second failure determination unit determines whether or not a failure is occurring in the automatic transmission after a predetermined period elapses further after the neutral termination control is executed, and
in the case where it is determined by the first failure determination unit that a failure is occurring, the second failure determination unit determines whether or not a failure is occurring in the automatic transmission without waiting for the predetermined period to elapse after the neutral control is executed.

5. The control device for an automatic transmission according to claim 1, wherein
the state in which the vehicle is running forward is a state in which the vehicle is running forward at a prescribed speed determined in advance or more.

6. The control device for an automatic transmission according to claim 2, wherein
the state in which the vehicle is running forward is a state in which the vehicle is running forward at a prescribed speed determined in advance or more.

7. The control device for an automatic transmission according to claim 3, wherein
the state in which the vehicle is running forward is a state in which the vehicle is running forward at a prescribed speed determined in advance or more.

8. The control device for an automatic transmission according to claim 4, wherein
the state in which the vehicle is running forward is a state in which the vehicle is running forward at a prescribed speed determined in advance or more.

9. The control device for an automatic transmission according to claim 1, wherein
the neutral control unit includes a second neutral termination control unit that executes neutral termination control for shifting the automatic transmission to any one of the plurality of predetermined shift speeds in the case where it is determined by the first failure determination unit that a failure is occurring.

10. A control program for an automatic transmission that is disposed in a power transfer path from a drive source of a vehicle to drive wheels, that includes a plurality of frictional engagement elements, an input shaft, and an output shaft, and that can establish a plurality of predetermined shift speeds that are different in speed ratio in accordance with an engagement state of the plurality of frictional engagement elements, the speed ratio being a ratio between a rotating speed of the input shaft and a rotating speed of the output shaft, the control program causing a computer to implement:
a neutral control function of executing neutral control for bringing the automatic transmission into a neutral state by reducing an engagement force for an engaged frictional engagement element in the case where running conditions are satisfied, the neutral state being a state in which power transfer between the input shaft and the output shaft is suppressed, and the running conditions including an accelerator of the vehicle not being operated in a state in which the vehicle is running forward and in a state in which any one of the plurality of predetermined shift speeds is established;
a speed ratio specifying function of specifying an actual speed ratio of the automatic transmission on the basis of the rotating speed of the input shaft and the rotating speed of the output shaft; and
a first failure determination function of determining whether or not a failure is occurring in the automatic transmission on the basis of the actual speed ratio, the first failure determination function determining that a failure is occurring in the automatic transmission during the neutral state when the actual speed ratio coincides with the speed ratio of any one of the plurality of predetermined shift speeds over a predetermined time.

* * * * *